United States Patent
Kocienda et al.

(10) Patent No.: US 7,694,231 B2
(45) Date of Patent: Apr. 6, 2010

(54) KEYBOARDS FOR PORTABLE ELECTRONIC DEVICES

(75) Inventors: Kenneth Kocienda, Sunnyvale, CA (US); Scott Herz, Santa Clara, CA (US); Richard Williamson, Los Gatos, CA (US); Gregory Novick, Santa Clara, CA (US); Virgil Scott King, Mountain View, CA (US); Chris Blumenberg, San Francisco, CA (US); Marcel Van Os, San Francisco, CA (US); Bas Ording, San Francisco, CA (US); Scott Forstall, Mountain View, CA (US); Imran Chaudhri, San Francisco, CA (US); Greg Christie, San Jose, CA (US); Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 820 days.

(21) Appl. No.: 11/459,606

(22) Filed: Jul. 24, 2006

(65) Prior Publication Data

US 2007/0152978 A1    Jul. 5, 2007

Related U.S. Application Data

(60) Provisional application No. 60/756,890, filed on Jan. 5, 2006.

(51) Int. Cl.
    *G06F 3/048* (2006.01)
(52) U.S. Cl. .................. 715/773; 715/864; 345/168; 345/169; 345/173; 345/619; 341/20; 341/22; 341/23

(58) Field of Classification Search .................. 345/168, 345/169, 173, 619; 341/20, 22, 23; 715/773, 715/864
See application file for complete search history.

(56) References Cited

U.S. PATENT DOCUMENTS 5,565,894 A    10/1996    Bates et al. .................. 345/178

(Continued)

FOREIGN PATENT DOCUMENTS

EP    0 880 090 A2    11/1998

(Continued)

OTHER PUBLICATIONS

Sony Ericsson Mobile Communications AB: "P900 User Guide" XP002479719, [Online] Sep. 2003, pp. 8, 16,17,20, 24-26, 42-45, 137, (98 total pages), http://www.sonyericcson.com/downloads/P900_UG_R1b_EN.pdf.

(Continued)

*Primary Examiner*—Richard Hjerpe
*Assistant Examiner*—Gregory J Tryder
(74) *Attorney, Agent, or Firm*—Morgan Lewis & Bockius LLP

(57) ABSTRACT

A plurality of icons are displayed on a touch-sensitive display. A respective icon in at least a subset of the plurality of icons corresponds to two or more symbols. A contact by a user with the touch-sensitive display that corresponds to the respective icon is detected. A respective symbol in the two or more symbols to which the contact further corresponds is determined. The displayed respective icon is modified to indicate that the contact corresponds to the respective symbol.

17 Claims, 33 Drawing Sheets

U.S. PATENT DOCUMENTS

| | | | | |
|---|---|---|---|---|
| 5,736,974 | A * | 4/1998 | Selker | 715/862 |
| 5,748,512 | A | 5/1998 | Vargas | 364/709 |
| 5,801,941 | A | 9/1998 | Bertram | 364/188 |
| 5,818,451 | A | 10/1998 | Bertram et al. | 345/354 |
| 5,963,671 | A | 10/1999 | Comerford et al. | 382/230 |
| 6,040,824 | A | 3/2000 | Maekawa et al. | 345/173 |
| 6,049,326 | A | 4/2000 | Beyda et al. | 345/157 |
| 6,073,036 | A * | 6/2000 | Heikkinen et al. | 455/550.1 |
| 6,169,538 | B1 * | 1/2001 | Nowlan et al. | 345/168 |
| 6,259,436 | B1 | 7/2001 | Moon et al. | 345/173 |
| 6,271,835 | B1 * | 8/2001 | Hoeksma | 345/168 |
| 6,323,846 | B1 | 11/2001 | Westerman et al. | 345/173 |
| 6,359,572 | B1 | 3/2002 | Vale | 341/23 |
| 6,469,722 | B1 * | 10/2002 | Kinoe et al. | 715/837 |
| 6,570,557 | B1 | 5/2003 | Westerman et al. | 345/173 |
| 6,573,844 | B1 | 6/2003 | Venolia et al. | 341/22 |
| 6,597,345 | B2 * | 7/2003 | Hirshberg | 345/168 |
| 6,654,733 | B1 | 11/2003 | Goodman et al. | 706/52 |
| 6,677,932 | B1 | 1/2004 | Westerman et al. | 345/173 |
| 6,795,059 | B2 | 9/2004 | Endo | 345/173 |
| 6,803,905 | B1 * | 10/2004 | Capps et al. | 345/173 |
| 6,857,800 | B2 * | 2/2005 | Zhang et al. | 400/473 |
| 7,038,659 | B2 * | 5/2006 | Rajkowski | 345/156 |
| 7,057,607 | B2 * | 6/2006 | Mayoraz et al. | 345/173 |
| 7,194,699 | B2 * | 3/2007 | Thomson et al. | 715/823 |
| 7,443,316 | B2 * | 10/2008 | Lim | 341/22 |
| 7,477,240 | B2 | 1/2009 | Yanagisawa | 345/173 |
| 7,526,738 | B2 * | 4/2009 | Ording et al. | 715/862 |
| 2002/0015024 | A1 | 2/2002 | Westerman et al. | 345/173 |
| 2002/0051018 | A1 | 5/2002 | Yeh | 345/784 |
| 2002/0135615 | A1 | 9/2002 | Lang | 345/764 |
| 2002/0140679 | A1 * | 10/2002 | Wen | 345/168 |
| 2002/0167545 | A1 | 11/2002 | Kang et al. | 345/780 |
| 2003/0063073 | A1 | 4/2003 | Geaghan et al. | 345/173 |
| 2004/0009788 | A1 | 1/2004 | Mantyjarvi et al. | 455/550.1 |
| 2004/0135774 | A1 * | 7/2004 | La Monica | 345/174 |
| 2004/0160419 | A1 * | 8/2004 | Padgitt | 345/173 |
| 2004/0165924 | A1 | 8/2004 | Griffin | 400/486 |
| 2004/0178994 | A1 | 9/2004 | Kairls, Jr. | 345/173 |
| 2004/0183833 | A1 | 9/2004 | Chua | 345/773 |
| 2004/0218963 | A1 | 11/2004 | Van Diepen et al. | 400/472 |
| 2005/0024341 | A1 * | 2/2005 | Gillespie et al. | 345/173 |
| 2005/0190970 | A1 | 9/2005 | Griffin | 382/209 |
| 2005/0253818 | A1 | 11/2005 | Nettamo | 345/173 |
| 2006/0007174 | A1 | 1/2006 | Shen | 345/173 |
| 2006/0053387 | A1 | 3/2006 | Ording | 715/773 |
| 2006/0161846 | A1 * | 7/2006 | Van Leeuwen | 715/702 |
| 2006/0274051 | A1 | 12/2006 | Longe et al. | 345/173 |
| 2007/0061754 | A1 * | 3/2007 | Ardhanari et al. | 715/816 |
| 2007/0152978 | A1 * | 7/2007 | Kocienda et al. | 345/173 |

FOREIGN PATENT DOCUMENTS

| | | |
|---|---|---|
| EP | 1 271 295 A2 | 1/2003 |
| EP | 1 674 976 A2 | 6/2006 |
| GB | 2 332 293 A | 6/1999 |
| GB | 2 337 349 A | 11/1999 |
| GB | 2 351 639 A | 1/2001 |
| GB | 2 380 583 A | 4/2003 |
| WO | WO 98/33111 A1 | 7/1998 |
| WO | WO 00/38042 A1 | 6/2000 |
| WO | WO 03/098417 A2 | 11/2003 |
| WO | WO 2004/051392 A2 | 6/2004 |
| WO | WO 2005/006442 A1 | 7/2005 |
| WO | WO 2006/003590 A2 | 1/2006 |
| WO | WO 2006/115946 A2 | 11/2006 |

OTHER PUBLICATIONS

Invitation to Pay Additional Fees for International Application No. PCT/US2007/088904, mailed Jun. 23, 2008.

International Search Report and Written Opinion for International Application No. PCT/US2007/088904, mailed Sep. 15, 2008.

Invitation to Pay Additional Fees for International application No. PCT/US2007/060119 dated Jan. 2, 2008.

Centroid, http://faculty,evansville.edu/ck6/tcenters/class/centroid.html, printed Apr. 28, 2006, 4 pages.

International Search Report and Written Opinion for International Application No. PCT/US2008/050426, mailed Jun. 13, 2008.

Office Action dated Mar. 19, 2009, for related U.S. Appl. No. 11/228,737.

International Search Report and Written Opinion for International Application PCT/US2007/060119, mailed Apr. 11, 2008.

Day, B., "Will Cell Phones Render iPods Obselete?" http://weblogs.javanet/pub/wig/883, Jan. 6, 2004.

O'Neal, W., Sr. Ed., "Smart Phones with Hidden Keyboards," http://msc.com/4250-6452__16-6229969-1.html, Jul. 21, 2005.

Sears, A., et al., "Data Entry for Mobile Devices Using Soft Keyboards: Understanding the Effects of Keyboard Size and User Tasks," Abstract, Int'l Journal of Human-Computer Interaction, vol. 16, No. 2, pp. 163-184, 2003.

"Microsoft's New Smart Phone Interface: Your Thumbs," http://www.textually.org, Apr. 6, 2005.

"LG Develops New Touch Pad Cell Phones," http://textually.org/textually/archives/2005/06/008803.htm, Jun. 22, 2005.

"Samsung Releases Keyboard Phone in US," http://www.textually.org/textually/archives/2005/11/010482.htm, Nov. 3, 2005.

"You Heard of Touch Screens Now Check Out Touch Keys," http://www.phoneyworld.com, Nov. 18, 2005.

"Touch Screen Keypad for Mobile Phone by DoCoMo," http://Casario.blogs.com/mmworld/2005/10/touch_screen_ke.html, Nov. 8, 2005.

"Fastap™ keypads redefine mobile phones," http://www.digitwireless.com. 2004.

FAQ—DigitWireless, http://www.digitwireless.com/about/faq.html, 2004.

"Delta II—the right cell phone keypad matrix for the $21^{st}$ century," http://www.chidagologic.com, Nov. 2005.

"T9® Text Input for Keypad Devices," http://tegic.com, Nov. 18, 2005.

"Text Input Methods," WikiPodLinus, http://ipodlinux.org/Text_Input_Methods, Dec. 5, 2005.

"Compare keyboards with the keyboard compatibility chart, learn more about alternative keyboards," http://www.keyalt.com/kkeybrdp.htm, Dec. 8, 2005.

"Technology Loan Catalog—Devices," http://www.tsbvi.edu/outreach/techloan/catalog.html, Nov. 3, 2004.

Office Action dated May 22, 2009, for related U.S. Appl. No. 11/459,615.

Office Action dated Oct. 10, 2008, received in the European Patent Application 07 709 955.4 which corresponds to U.S. Appl. No. 11/459,606.

Office Action dated Jul. 31, 2009, received in the European Patent Application 07 709 955.4 which corresponds to U.S. Appl. No. 11/459,606.

* cited by examiner

Symbol Entry Process
1130

Display a Plurality of Icons on a Touch-Sensitive Display, a Respective Icon Corresponding to Two or More Symbols, A First Symbol Belonging to a First Subset of Symbols and a Second Symbol Belonging to a Second Subset of Symbols, the First Symbol Having a Probability of Occurrence Greater Than That of the Second Symbol ⤳ 1132

Detect a Contact by a User With the Display That Corresponds to Selection of the Respective Icon ⤳ 1134

Determine a Symbol in the Two or More Symbols for the Respective Icon to Which the Contact Further Corresponds ⤳ 1136

Figure 11B

Symbol Entry Process
1150

```
Display a Plurality of Icons on a Touch-Sensitive
Display, a Respective Icon Corresponding to Two or
More Symbols, A First Symbol Belonging to a First
Subset of Symbols and a Second Symbol Belonging
to a Second Subset of Symbols, the Second Symbol      ⟿ 1152
Having a Probability of Occurrence Immediately
Following the First Symbol That is Less Than a Pre-
Determined Value
```

```
Detect a Contact by a User With the Display That
Corresponds to Selection of the Respective Icon       ⟿ 1154
```

```
Determine a Symbol in the Two or More Symbols for
the Respective Icon to Which the Contact Further     ⟿ 1156
Corresponds
```

Figure 11C

Symbol Entry Process
1600

```
┌─────────────────────────────────────────────┐
│ Display a Plurality of Icons on a Touch-Sensitive │
│ Display. The Plurality of Icons are Arranged in Two │
│ or More Rows of the Touch-Sensitive Display. A │
│ First Guard Band Between Adjacent Icons in a First │
│ Subset of the Icons in a Row is Less Than a Pre- │
│ Determined Width and a Second Guard Band │
│ Between Adjacent Icons in a Second Subset of the │
│ Icons in the Row is Greater Than a Pre-Determined │
│ Width. The First Subset is Approximately in a │──1610
│ Central Region of the Two or More Rows and the │
│ Second Subset is Closer Than the First Subset to │
│ an Edge Region of the Two or More Rows. │
└─────────────────────────────────────────────┘
                        │
                        ▼
┌─────────────────────────────────────────────┐
│ Detect a Contact by a User With the Display That │──1612
│ Corresponds to Selection of the Respective Icon │
└─────────────────────────────────────────────┘
                        │
                        ▼
┌─────────────────────────────────────────────┐
│ Display a Symbol Corresponding to the Respective │──1614
│ Icon │
└─────────────────────────────────────────────┘
```

Figure 16

KEYBOARDS FOR PORTABLE ELECTRONIC DEVICES

RELATED APPLICATIONS

This application claims priority to U.S. Provisional Patent Application No. 60/756,890, filed Jan. 5, 2006, entitled "Keyboards for Portable Electronic Devices," which application is incorporated by reference herein in its entirety.

This application is related to U.S. patent application Ser. No. 11/459,615, filed Jul. 24, 2006, entitled "Touch Screen Keyboards for Portable Electronic Devices," which application is incorporated by reference herein in its entirety.

This application is related to U.S. patent application Ser. No. 11/228,700, filed Sep. 16, 2005, entitled "Operation of a Computer with Touch Screen Interface," which application is incorporated by reference herein in its entirety.

TECHNICAL FIELD

The disclosed embodiments relate to user interfaces, and in particular, to user interfaces that include a touch screen keyboard.

BACKGROUND

As portable devices become more compact, and the amount of information to be processed and stored increases, it has become a significant challenge to design a user interface that allows users to easily interact with the device. This is unfortunate since the user interface is the gateway through which users receive not only content but also responses to user actions or behaviors, including user attempts to access a device's features or tools. Some portable electronic devices (e.g., mobile phones) have resorted to adding more pushbuttons, increasing a density of push buttons, overloading the functions of pushbuttons, or using complex menu systems to allow a user to access, store and manipulate data. These conventional user interfaces often result in complicated key sequences and menu hierarchies that must be memorized by the user. In addition, as the number of pushbuttons has increased the proximity of neighboring buttons often makes it difficult for users to activate a desired pushbutton.

Many conventional user interfaces, such as those that include physical pushbuttons, are also inflexible. This is unfortunate since it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Accordingly, there is a need for more transparent and intuitive user interfaces for portable electronic devices that are easy to use, configure, and/or adapt.

SUMMARY OF EMBODIMENTS

The above deficiencies and other problems associated with user interfaces for portable devices are reduced or eliminated by the disclosed touch screen keyboards and their methods of use.

In some embodiments, a method includes displaying a plurality of icons on a touch-sensitive display. A respective icon in at least a subset of the plurality of icons corresponds to two or more symbols. A contact by a user with the touch-sensitive display that corresponds to the respective icon is detected. A respective symbol in the two or more symbols to which the contact further corresponds is determined. The displayed respective icon is modified to indicate that the contact corresponds to the respective symbol.

The respective symbol may be selected when the user breaks contact with the respective icon. The respective symbol may be capitalized when contact is maintained for a time interval exceeding a pre-determined value.

Modifying may include changing a shape of the respective icon. Changing the shape may include an asymmetric distortion of the shape. An initial shape of the respective icon may include an arc.

Detecting may include detecting rolling of a finger over a region that corresponds to the respective symbol. The contact may include a gesture that is selected from the group consisting of one or more taps, a swipe and a rolling of a finger.

The two or more symbols for the respective icon may be determined in accordance with a lexicography model. The lexicography model may correspond to a user usage history. The user usage history may occur prior to the establishment of the contact. The lexicography model may correspond to a frequency of usage of symbols in a language.

In some embodiments, the respective symbol is displayed in a region within the shape of the respective icon and outside of a region corresponding to the contact.

In some embodiments, a visual indicator corresponding to the respective symbol is provided. The visual indicator may include visual illumination proximate to the respective icon. The visual illumination may include a band around at least a portion of the respective icon. The visual indicator may be in accordance with a user usage history that occurs prior to the detecting of the contact.

In some embodiments, a method includes displaying a plurality of icons on a touch-sensitive display. Two or more subsets of the plurality of icons are arranged in corresponding rows on the touch-sensitive display. A space greater than a pre-determined value is included between adjacent rows. A contact by a user with the touch-sensitive display that corresponds to a respective icon is detected. A symbol corresponding to the respective icon is displayed in the space between a respective row corresponding to the respective icon and a neighboring row while the contact is maintained.

The symbol may be the respective icon. The symbol may be magnified relative to the respective icon. The neighboring row may be above the respective row.

In another embodiment, a plurality of icons are displayed on a touch-sensitive display. A contact by a user with the touch-sensitive display that corresponds to the respective icon is determined. A symbol corresponding to the respective icon is displayed superimposed over one or more additional icons in the plurality of icons while the contact is maintained.

In another embodiment, a plurality of icons are displayed on a touch-sensitive display. Two or more subsets of the plurality of icons are arranged in corresponding rows. A contact by a user with the touch-sensitive display that corresponds to the respective icon is determined. The displayed plurality of icons are modified to include a space greater than a pre-determined value between a row corresponding to the respective icon and an adjacent row on the touch-sensitive display while the contact is maintained. A symbol corresponding to the respective icon is displayed in the space while the contact is maintained.

In some embodiments, a method includes displaying a plurality of icons on a touch-sensitive display. A respective icon in the plurality of icons corresponds to at least one symbol. One or more recommended words are displayed. The one or more recommended words are in accordance with a user history. The one or more recommended words are displayed prior to detecting any contacts by a user corresponding to symbol selection in a current application session. A contact by the user with the touch-sensitive display is detected. The contact includes a gesture. A respective recommended word corresponding to the gesture is selected.

The gesture may include a swipe motion. The swipe motion may include a horizontal component with displacement from left to right or from right to left along the touch-sensitive display. The swipe motion may include a vertical component with displacement downward or upward along the touch-sensitive display.

The gesture may include one or more taps. A respective tap may include making contact with the touch-sensitive display for a time interval less than a pre-determined value.

The gesture may include a rolling motion of the contact. The rolling motion may be from left to right or from right to left along the touch-sensitive display.

In some embodiments, a method includes displaying a plurality of icons on a touch-sensitive display. A respective icon in at least a subset of the plurality of icons corresponds to two or more symbols. A contact by a user with the touch-sensitive display that corresponds to a selection of the respective icon, wherein the contact includes a respective gesture, is detected. A respective symbol in the two or more symbols for the respective icon to which the contact further corresponds is determined. The respective symbol is a first symbol in the two or more symbols if the respective gesture includes a continuous contact and the respective symbol is a second symbol in the two or more symbols if the respective gesture includes a discontinuous contact.

The continuous contact may include a swipe motion. The swipe motion may include a horizontal component with displacement from left to right or from right to left along the touch-sensitive display. The swipe motion may include a vertical component with displacement downward or with displacement upward along the touch-sensitive display. The continuous contact may include a rolling motion of the contact. The rolling motion may be from left to right or from right to left along the touch-sensitive display.

The discontinuous contact may include one or more taps. A respective tap may include contact with the touch-sensitive display for a time interval less than a first pre-determined value. Two or more consecutive taps may correspond to the second symbol if a time interval between two or more corresponding contacts is less than a second pre-determined value.

The first symbol may be included in a first subset of symbols and the second symbol may be included in a second subset of symbols. The first subset of symbols may have a probability of occurrence that is greater than a first pre-determined value and the second subset of symbols may have a probability of occurrence that is less than the first pre-determined value.

The probability of occurrence may be in accordance with a user history. The probability of occurrence may be in accordance with a lexicography model. The lexicography model may include a frequency of usage of symbols in a language.

In some embodiments, the second symbol for the respective icon has a probability of occurrence immediately following the first symbol for the respective icon that is less than a second pre-determined value. In some embodiments, the first symbol for the respective icon has a probability of occurrence immediately following the second symbol for the respective icon that is less than a second pre-determined value.

In some embodiments, the displayed respective icon is modified to indicate that the contact corresponds to a respective symbol. In some embodiments, a visual indicator corresponding to a respective symbol is provided. The visual indicator may include visual illumination proximate to the respective icon. The visual illumination may include a band around at least a portion of the respective icon.

In some embodiments, a method includes displaying a plurality of icons on a touch-sensitive display. A respective icon in at least a subset of the plurality of icons corresponds to two or more symbols. A first symbol in the two or more symbols belongs to a first subset of symbols and a second symbol in the two or more symbols belongs to a second subset of symbols. The first symbol has a probability of occurrence that is greater than a first pre-determined value and the second symbol has a probability of occurrence that is less than the first pre-determined value. A contact by a user with the touch-sensitive display that corresponds to a selection of the respective icon is detected. The contact includes a respective gesture. A respective symbol in the two or more symbols for the respective icon to which the contact further corresponds is determined.

The probability of occurrence may be in accordance with a user history. The probability of occurrence may be in accordance with lexicography model. The lexicography model may include a frequency of usage of symbols in a language. The second symbol may have a probability of occurrence immediately following the first symbol that is less than a second pre-determined value.

The first symbol may be selected using one or more tap gestures and the second symbol may be selected using a swipe gesture. A respective tap may include making contact with the touch-sensitive display for a time interval less than a second pre-determined value. Two or more consecutive taps may correspond to the second symbol if a time interval between two or more corresponding contacts is less than a third pre-determined value.

In some embodiments, the displayed respective icon is modified to indicate that the contact corresponds to the respective symbol. In some embodiments, a visual indicator corresponding to the respective symbol is provided. The visual indicator may include visual illumination proximate to the respective icon. The visual illumination may include a band around at least a portion of the respective icon.

In some embodiments, the first subset of symbols includes e, t, a, o, i, n, s, r and h. In some embodiments, the first subset of symbols includes q, e, u, I, o, a, d, g, j, l, z, c, b, n and m. In some embodiments, the first subset of symbols includes q, c, e, h, I, l, n, o, r, t, u, w and y.

In some embodiments, the second subset of symbols includes w, y, and j. In some embodiments, the second subset of symbols includes w, y, p, g and j. In some embodiments, the second subset of symbols includes w, r, t, y, p, s, f, h, k, x and v. In some embodiments, the second subset of symbols includes j, v, x and z. In some embodiments, the second subset of symbols includes b, d, f, g, j, k, m, p, q, s, v, x and z.

The aforementioned methods may be performed by a portable electronic device having a touch-sensitive display with a graphical user interface (GUI), one or more processors, memory and one or more modules, programs or sets of instructions stored in the memory for performing these methods. In some embodiments, the portable electronic device provides a plurality of functions, including wireless communication.

Instructions for performing the aforementioned methods may be included in a computer program product configured for execution by one or more processors.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 11B is a flow diagram of an embodiment of a symbol entry process.

FIG. 11C is a flow diagram of an embodiment of a symbol entry process.

FIG. 16 is a flow diagram of an embodiment of a symbol entry process.

DESCRIPTION OF EMBODIMENTS

Figure 1:
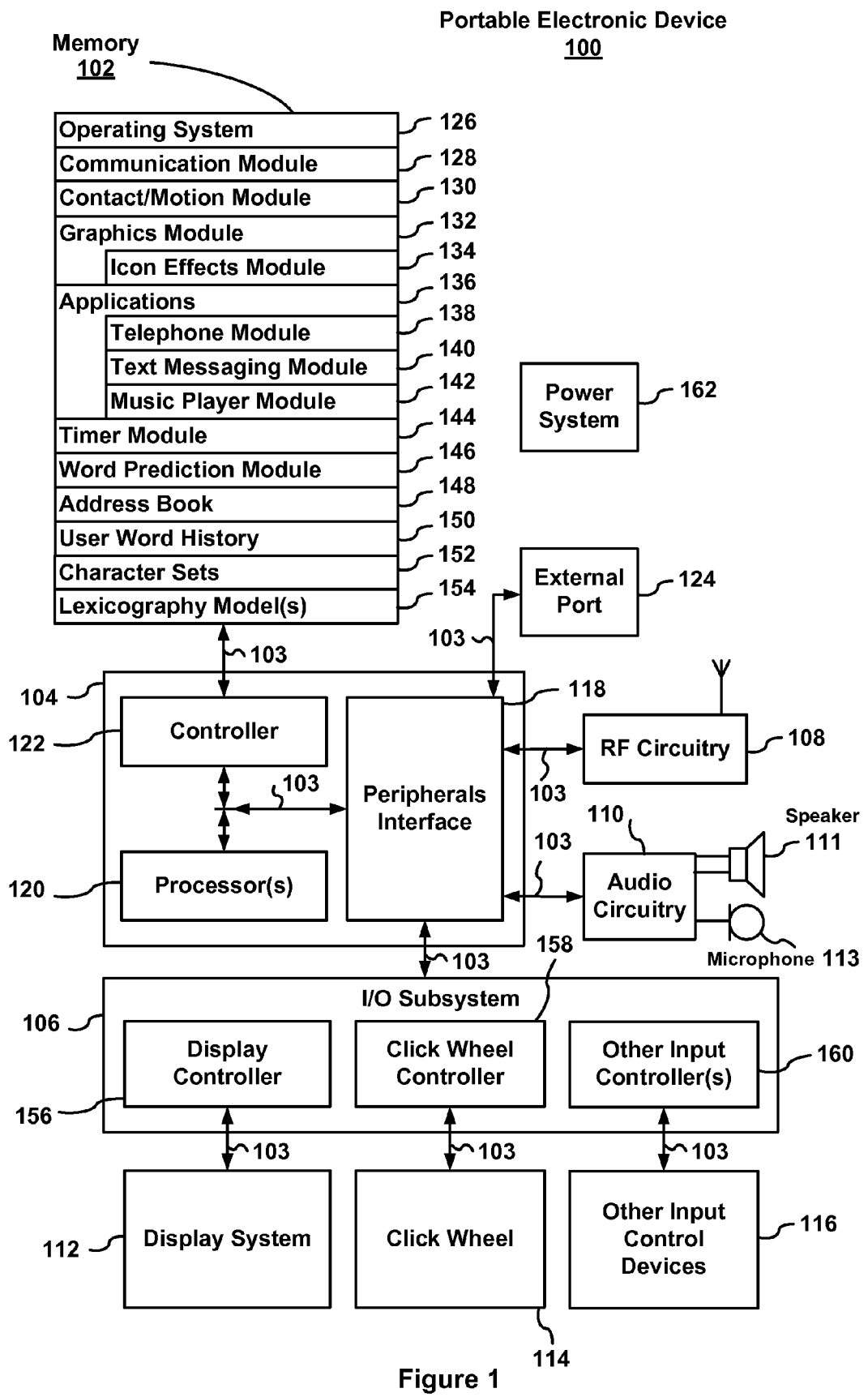
FIG. 1 is a block diagram illustrating an embodiment of an architecture for a portable electronic device.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of user interfaces and associated processes for using a device are described. In some embodiments, the device may be a portable communications device. The user interface may include a click wheel and/or touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel. For simplicity, in the discussion that follows, a portable communications device (e.g., a cellular telephone that may also contain other functions, such as SMS, PDA and/or music player functions) that includes a touch screen is used as an exemplary embodiment. It should be understood, however, that the user interfaces and associated processes may be applied to other devices, such as personal computers and laptops, that may include one or more other physical user-interface devices, such as a click wheel, a keyboard, a mouse and/or a joystick.

The device may support a variety of applications, such as a telephone, text messaging, word processing, email and a music player. The music player may be compatible with one or more file formats, such as MP3 and/or AAC. In an exemplary embodiment, the device includes an iPod music player (trademark of Apple Computer, Inc.).

The various applications that may be executed on the device may use at least one common physical user-interface device, such as the touch screen. In embodiments that include a click wheel, one or more functions of the click wheel as well as corresponding information displayed on the device may be adjusted and/or varied from one application to the next and/or within a respective application. In this way, a common physical architecture (such as the click wheel) of the device may support the variety of applications with user interfaces that are intuitive and transparent.

The user interfaces may include one or more keyboard embodiments. The keyboard embodiments may include standard (qwerty) and/or non-standard configurations of symbols on the displayed icons of the keyboard. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the keyboard embodiments.

Attention is now directed towards embodiments of the device. FIG. 1 is a block diagram illustrating an architecture for a portable electronic device 100, according to some embodiments of the invention. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, a display system 112 (which may include a touch screen), a click wheel 114, other input or control devices 116, and an external port 124. These components may communicate over the one or more communication buses or signal lines 103. The device 100 may be any portable electronic device, including but not limited to a handheld computer, a tablet computer, a mobile phone, a media player, a personal digital assistant (PDA), or the like, including a combination of two or more of these items. In other embodiments, the device 100 may not be portable, such as a personal computer.

It should be appreciated that the device 100 is only one example of a portable electronic device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 120, for instance network attached storage accessed via the RF circuitry 108 or the external port 124 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 120 and the peripherals interface 118, may be controlled by the memory controller 122.

The peripherals interface 118 couples the input and output peripherals of the device to the CPU 120 and the memory 102. The one or more processors 120 run or execute various software programs and/or sets of instructions stored in the memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends electromagnetic waves. The RF circuitry 108 converts electrical signals to/from electromagnetic waves and communicates with communications networks and other communications devices via the electromagnetic waves. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be may be retrieved from and/or transmitted to the memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (headphone for one or both ears) and input (microphone).

The I/O subsystem 106 provides the interface between input/output peripherals on the device 100, such as the display system 112, the click wheel 114 and other input/control devices 116, and the peripherals interface 118. The I/O subsystem 106 may include a display controller 156, a click wheel controller 158 and one or more input controllers 160 for other input or control devices. The one or more input controllers 160 receive/send electrical signals from/to other input or control devices 160. The other input/control devices 160 may include physical buttons (e.g., push buttons, rocker buttons, etc.), dials, slider switches, sticks, and so forth.

The display system 112 provides an output interface and/or an input interface between the device and a user. The display controller 156 receives and/or sends electrical signals from/to the display system 112. The display system 112 displays visual output to the user. The visual output may include text, icons, graphics, video, and any combination thereof. In some embodiments, some or all of the visual output may correspond to user-interface objects, further details of which are described below.

In some embodiments, such as those that include a touch screen, the display system 112 also accepts input from the user based on haptic and/or tactile contact. In embodiments with a touch screen, the display system 112 forms a touch-sensitive surface that accepts user input. In these embodiments, the display system 112 and the display controller 156 (along with any associated modules and/or sets of instructions in the memory 102) detect contact (and any movement or breaking of the contact) on the display system 112 and converts the detected contact into interaction with user-interface objects, such as one or more soft keys, that are displayed on a touch screen. In an exemplary embodiment, a point of contact between a touch screen in the display system 112 and the user corresponds to one or more digits of the user.

In embodiments with a touch screen, the touch screen in the display system 112 may use LCD (liquid crystal display) technology, or LPD (light emitting polymer display) technology, although other display technologies may be used in other embodiments. A touch screen in the display system 112 and the display controller 156 may detect contact and any movement or breaking thereof using any of a plurality of touch sensitivity technologies, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen in the display system 112 displays visual output from the portable device 100, whereas touch sensitive tablets do not provide visual output. The touch screen in the display system 112 may have a resolution in excess of 100 dpi. In an exemplary embodiment, the touch screen in the display system may have a resolution of approximately 168 dpi. The user may make contact with the touch screen in the display system 112 using any suitable object or appendage, such as a stylus, finger, and so forth.

In some embodiments, in addition to touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen in the display system 112 or an extension of the touch-sensitive surface formed by the touch screen.

The device 100 may include a click wheel 114. A user may navigate among one or more graphical objects (henceforth referred to as icons) displayed in the display system 112 by rotating the click wheel 114 or by moving (e.g., angular displacement) of a point of contact with the click wheel 114. The click wheel 114 may also be used to select one or more of the displayed icons. For example, the user may press down on at least a portion of the click wheel 114 or an associated physical button. User commands and navigation commands provided by the user via the click wheel 114 may be processed by the click wheel controller 158 as well as one or more of the modules and/or sets of instructions in the memory 102.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components stored in the memory 102 may include an operating system 126, a communication module (or set of instructions) 128, a contact/motion module (or set of instructions) 130, a graphics module (or set of instructions) 132, one or more applications (or set of instructions) 136, a timer module (or set of instructions) 144, a word prediction module (or set of instructions) 146, an address book 148, a user word history 150, one or more character sets 152, and one or more lexicography models 154. The graphics module 132 may include an icon effects module (or set of instructions) 134. The applications module 136 may include a telephone module (or set of instructions) 138, a text messaging module (or set of instructions) 140 and/or a music player module (or set of instructions) 142.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.).

The contact/motion module 130 may detect contact with the click wheel 114 and/or a touch screen in the display system 112 (in conjunction with the display controller 156). The contact/motion module 130 includes various software components for performing various operations related to detection of contact, such as determining if contact has occurred, determining if there is movement of the contact and tracking the movement across the click wheel 114 and/or a touch screen in the display system 112, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/motion module 130 and the display controller 156 also detect contact on a touchpad.

The graphics module 132 includes various known software components for rendering and displaying graphics on the display system 112. Note that the term "graphics" includes any object that can be displayed to a user, including without limitation text, web pages, icons (such as user-interface objects including soft keys), digital images, videos, animations and the like.

In some embodiments, the graphics module 132 includes the icon effects module 134. The icon effects module 134 may modify a displayed position of one or more icons on the display system 112 (in conjunction with the display controller 156) based on user actions (such as detecting a contact corresponding to at least one icon). In some embodiments, the modification of the displayed icon(s) may be based on an animation sequence.

In addition to the telephone module 138, the text messaging module 140 and/or the music player module 142, the one or more applications 136 may include any applications installed on the device 100, including without limitation, a browser, the address book 148, contact list, email, instant messaging, word processing, keyboard emulation, widgets, JAVA-enabled applications, encryption, digital rights management, voice recognition, voice replication, location determination capability (such as that provided by the global positioning system (GPS)), etc.

In conjunction with the RF circuitry 108, the audio circuitry 110, the speaker 111, the microphone 113, the display system 112, the display controller 156, the click wheel 114 and/or the click wheel controller 158, the telephone module 138 may be used to enter a sequence of characters corresponding to a telephone number, access one or more telephone numbers in the address book 148, modify a telephone number that has been entered, dial a respective telephone number, conduct a conversation and disconnect or hang up when the conversation is completed.

In conjunction with the display system 112, the display controller 156, the click wheel 114 and/or the click wheel controller 158, the text messaging module 140 may be used to enter a sequence of characters corresponding to a text message, to modify previously entered characters, to transmit a respective text message (for example, using a Short Message Service or SMS protocol), to receive text messages and to view received text messages. In some embodiments, transmitted and/or received text messages may include graphics, photos, audio files, video files and/or other attachments as are supported in a Multimedia Message Service (MMS) and/or an Enhanced Messaging Service (EMS). Embodiments of user interfaces and associated processes corresponding to the symbol entry, such as with the text messaging module 140, and more generally, to text entry and communication are described further below with reference to FIGS. 2-4, 6-9 and 11-20.

In conjunction with the display system 112, the display system controller 156, the click wheel 114, the click wheel controller 158, the audio circuitry 110, the speaker 111 and/or the microphone 113, the music player module 142 allows the user to play back recorded music stored in one or more files, such as MP3 or AAC files. In some embodiments, the device 100 may include the functionality of an MP3 player, such as an iPod (trademark of Apple Computer, Inc.). The device 100 may, therefore, include a 36-pin connector that is compatible with the iPod.

The timer module 144 may provide a time reference and/or time stamps for user commands received by the device 100, for example, using the click wheel 114 and the click wheel controller 158.

The word prediction module 146 may be used in conjunction with one or more of the applications 136, such as the text messaging module 140. The word prediction module 146 may suggest one or more words or symbols (such as punctuation marks, pronunciation marks or spaces) in accordance with a context. The context may be based on one or more of the lexicography models 154 (for example, grammatical and/or syntax rules associated with one or more languages) and/or a user word history 150. The context may include one or more previously entered words, characters, and/or symbols. The context may depend on which of the applications 136 is being used. For example, there may be different contexts for an email application as opposed to a word processing application. A user interface and associated process that include recommended words from the word prediction module 146 are discussed further below with reference to FIGS. 8 and 9.

The user word history 150 may include static content (such as that associated with a dictionary) and/or dynamic content (such as that associated with characters, symbols and/or words that are routinely and/or recently used by the user). The user word history 150 may include a static dictionary built up by scanning a user's address book, emails, and other documents. The user word history 150 may include weighted scores or probabilities for predicted words based on a set of characters, symbols and/or words that are provided by the user to the device 100, for example, using the display system 112, the click wheel 114 and the click wheel controller 158. The user word history 150 may also include use statistics (e.g., time of use and/or frequency of use) of one or more characters, symbols and/or words that are provided by the user. The user word history 150 is discussed further below with reference to FIGS. 10A and 10B.

The character sets 152 may include one or more sets of characters corresponding to numbers, letters and/or symbols. The letters and/or symbols may correspond to one or more languages. The character sets 152 may be used by one or more of the applications 136, such as the text messaging module 140. A data structure associated with the one or more character sets (which may be used in one or more of the keyboard embodiments) is discussed further below with reference to FIG. 5.

In some embodiments, the device 100 may include one or more optional optical sensors (not shown), such as CMOS or CCD image sensors, for use in imaging applications.

In some embodiments, the device 100 is a device where operation of a predefined set of functions on the device is performed exclusively through a touch screen in the display system 112 and/or a touchpad. By using a touch screen and/or a touchpad as the primary input/control device for operation of the device 100, the number of physical input/control devices (such as push buttons, dials, and the like) on the device 100 may be reduced. In one embodiment, the device 100 includes a touch screen, a touchpad, a push button for powering the device on/off and locking the device, a volume adjustment rocker button and a slider switch for toggling ringer profiles. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 113.

The predefined set of functions that are performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

In some embodiments, the device 100 is a device where operation of a predefined set of functions on the device is performed exclusively or primarily through the click wheel 114. By using the click wheel 114 as the primary input/control device for operation of the device 100, the number of other physical input/control devices (such as push buttons, dials, and the like) on the device 100 may be reduced.

Figure 2:
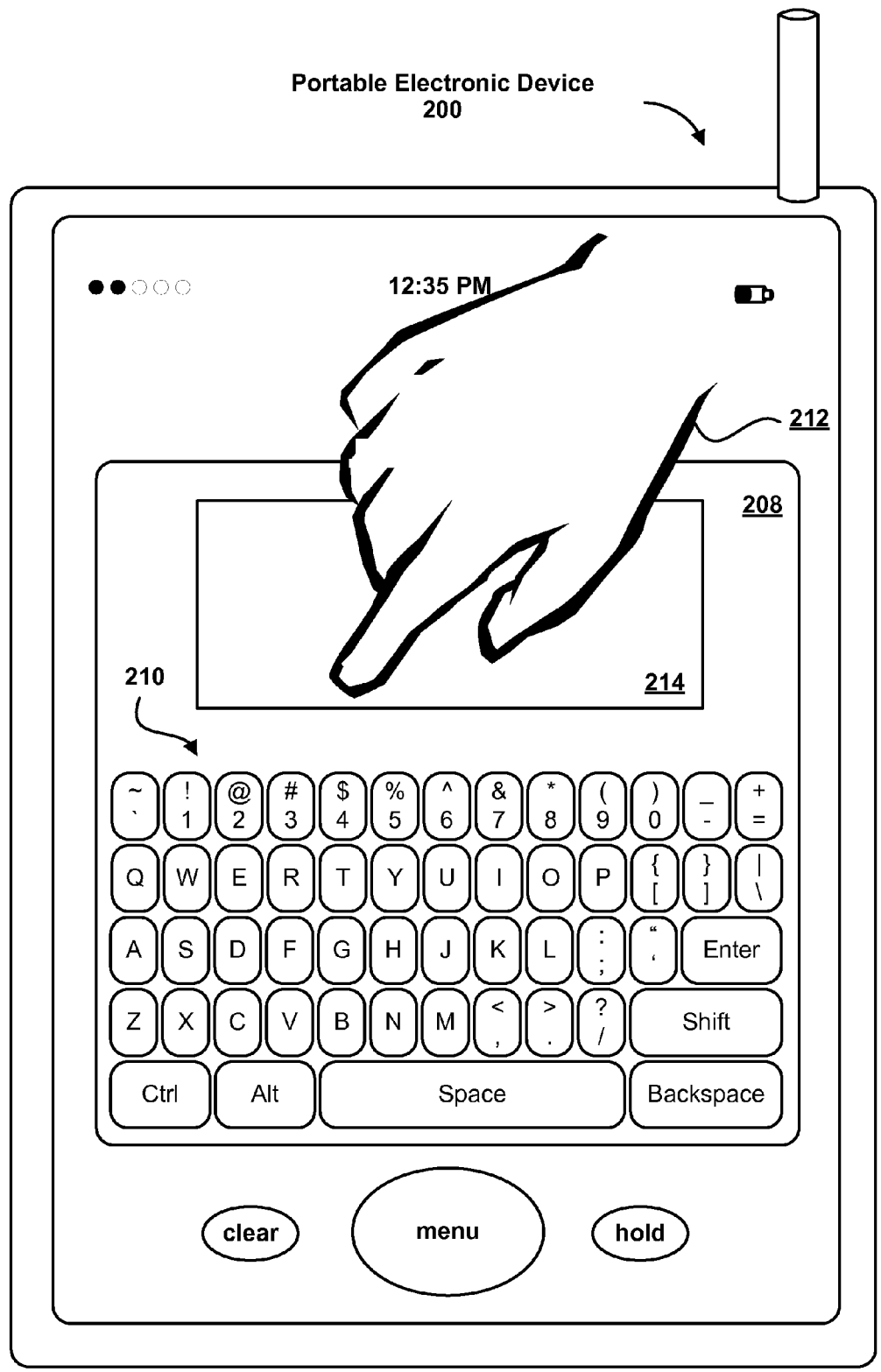
FIG. 2 is a schematic diagram illustrating an embodiment of a user interface for a portable electronic device.

Attention is now directed towards embodiments of user interfaces and associated processes that may be implemented on the device 100. FIG. 2 is a schematic diagram illustrating an embodiment of a user interface for a portable electronic device 200. The device 200 includes a touch screen 208. The touch screen may display one or more trays. A tray is a region within a graphical user interface. One tray may include a user entry interface, such as a keyboard 210 that includes a plurality of icons. The icons may include one or more symbols. In this embodiment, as well as others described below, a user may select one or more of the icons, and thus, one or more of the corresponding symbols, by making contact or touching the keyboard 210, for example, with one or more fingers 212 (not drawn to scale in the figure). The contact may correspond to the one or more icons. In some embodiments, selection of one or more icons occurs when the user breaks contact with the one or more icons. In some embodiments, the contact may include a gesture, such as one or more taps, one or more swipes (from left to right, right to left, upward and/or downward) and/or a rolling of a finger (from right to left, left to right, upward and/or downward) that has made contact with the device 200. In some embodiments, in advertent contact with an icon may not select a corresponding symbol. For example, a swipe gesture with an icon may not select a corresponding symbol when the gesture corresponding to selection is a tap.

The device 200 may include a display tray 214. The display tray 214 may display one or more of the characters and/or symbols that are selected by the user. The device 200 may also include one or more physical buttons, such as the clear, hold and menu buttons shown in FIG. 2. As described previously, the menu button may be used to navigate within a hierarchy of applications that may be executed on the device 200. Alternatively, in some embodiments, the clear, hold, and/or menu buttons are implemented as soft keys in a GUI in touch screen 208.

Figure 3A:
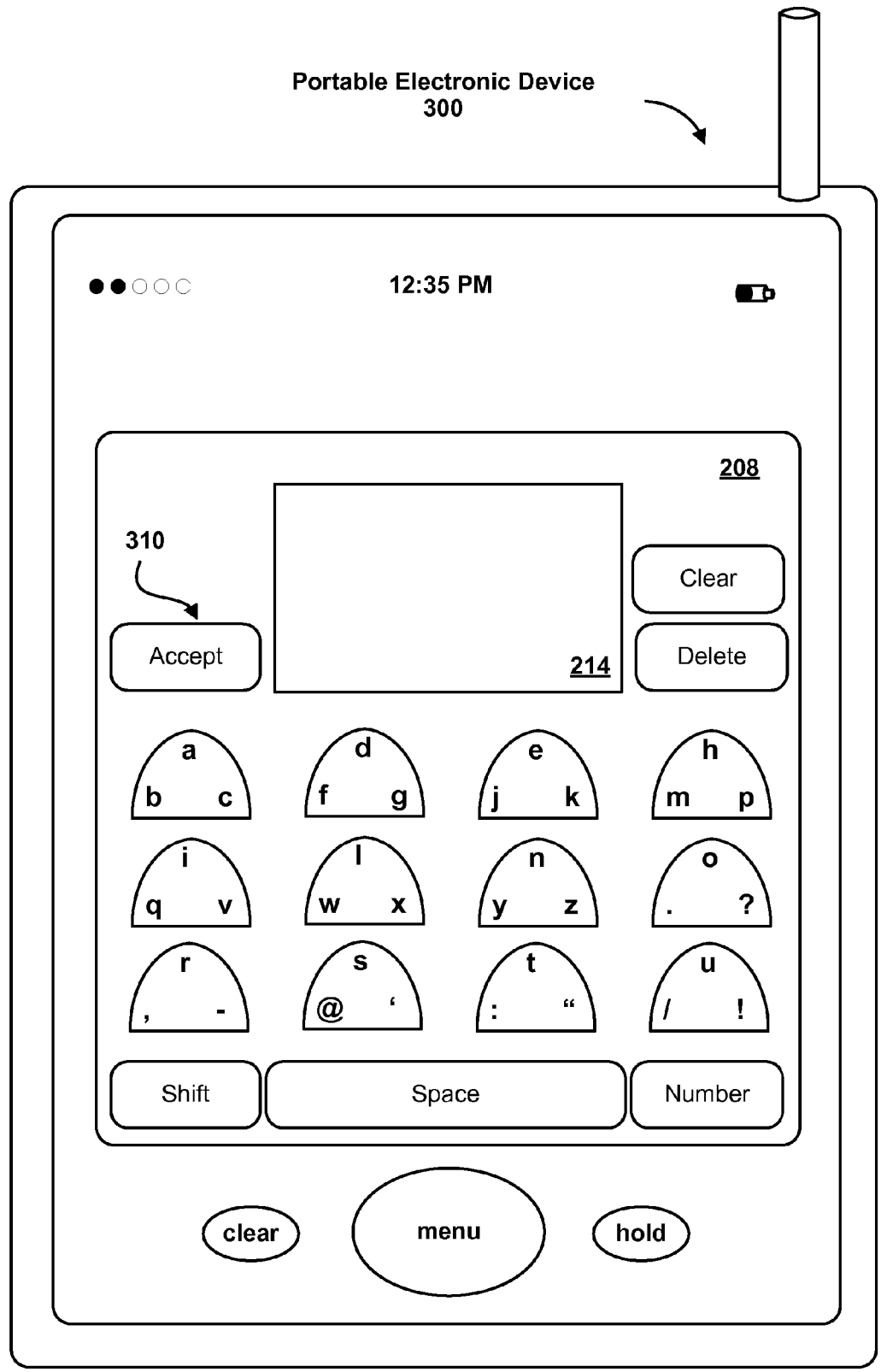
FIG. 3A is a schematic diagram illustrating an embodiment of a user interface for a portable electronic device.
Figure 3B:
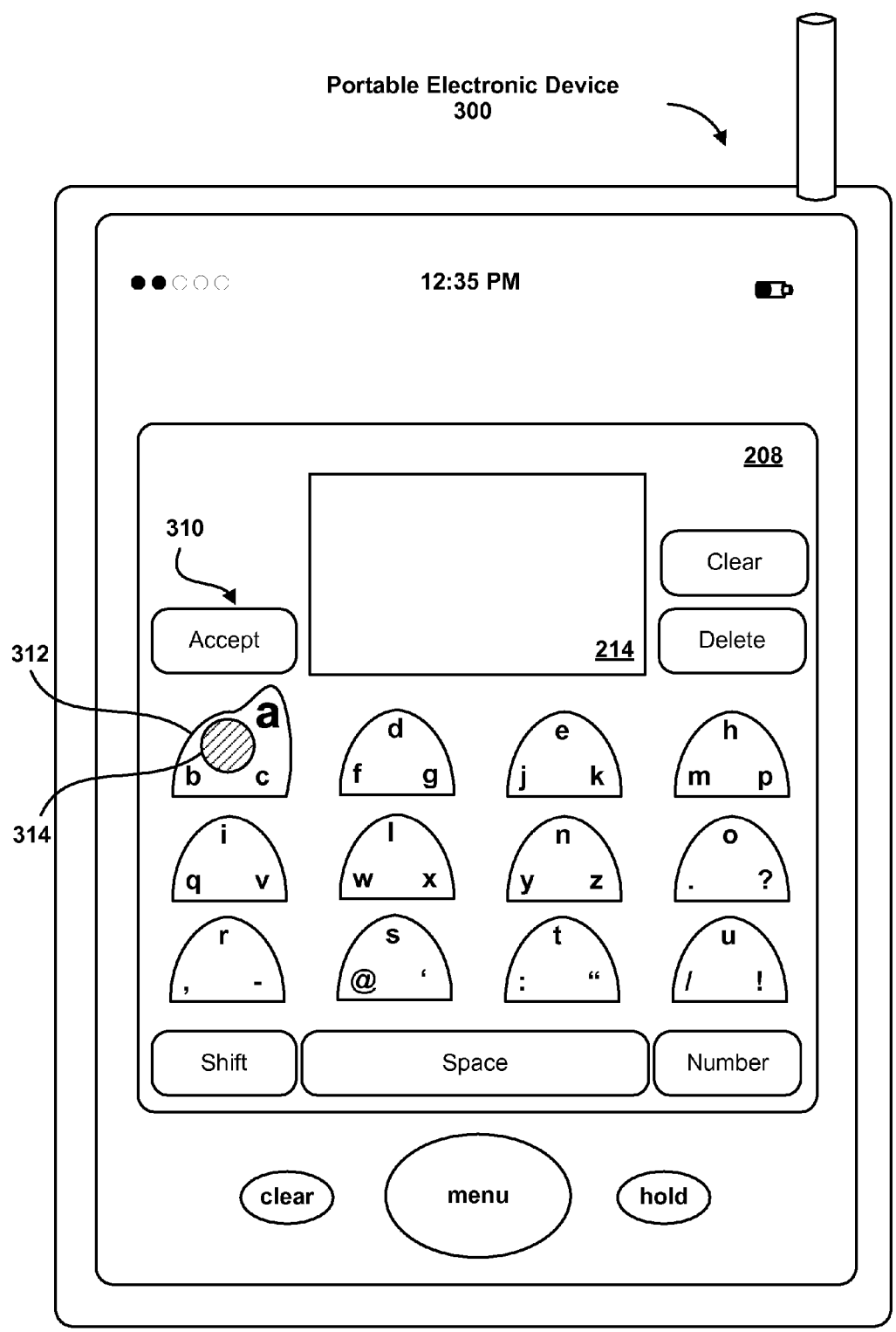
FIG. 3B is a schematic diagram illustrating an embodiment of a user interface for a portable electronic device.
Figure 3C:
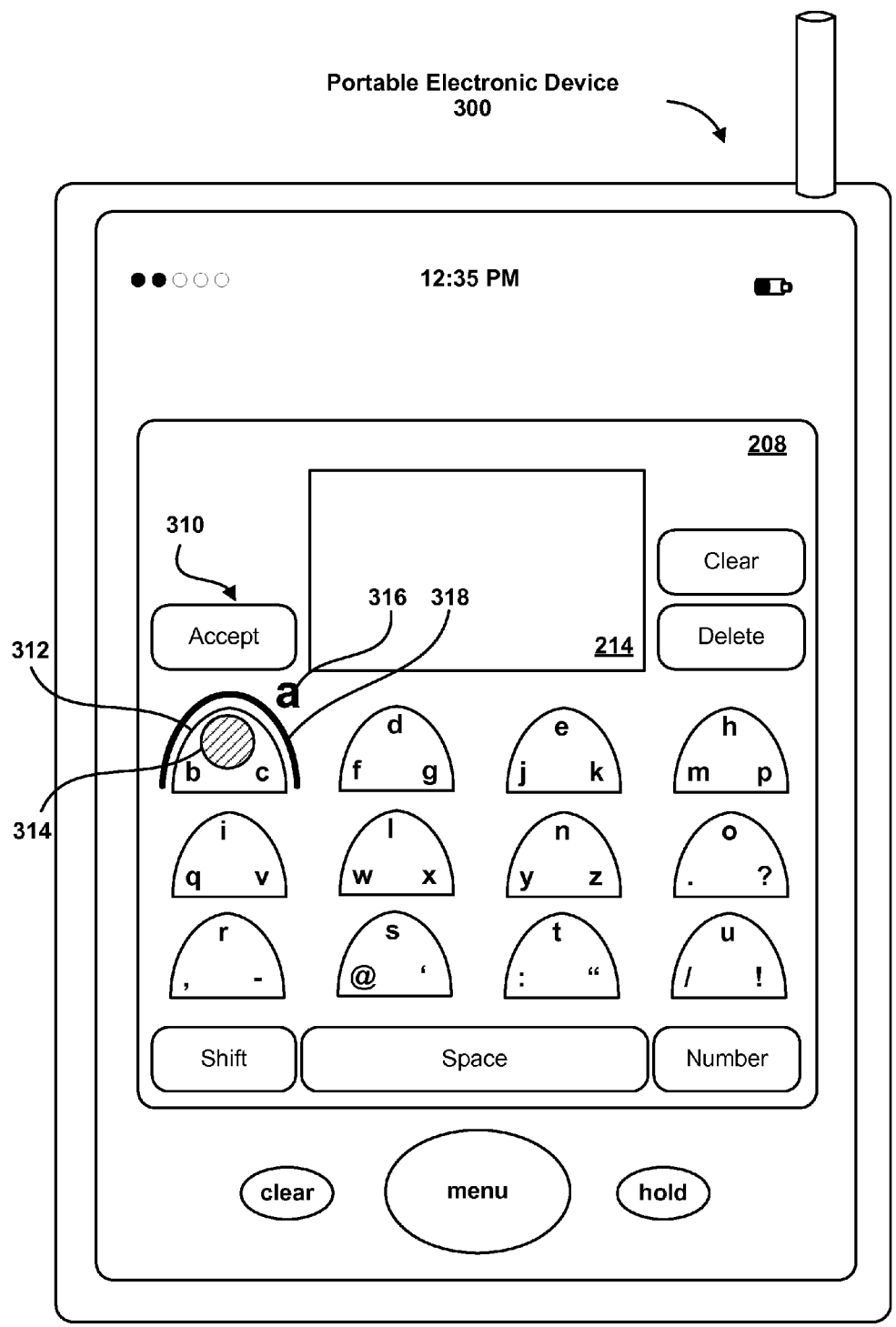
FIG. 3C is a schematic diagram illustrating an embodiment of a user interface for a portable electronic device.

FIGS. 3A-3C are schematic diagrams illustrating an embodiment of a user interface for a portable electronic device 300. The user interface includes a keyboard 310 that includes a plurality of icons. The icons include three symbols each. In other embodiments, the icons include two symbols each. In other embodiments, different icons on the same keyboard may include one, two, or three symbols each (e.g., some icons may contain one symbol while other icons contain two or three symbols). The symbols on the icons are in a non-standard configuration, i.e., non-qwerty. In addition, the total number of icons in the keyboard 310 is less than the number of physical keys in a standard keyboard.

The symbols in the icons in the keyboard 310 may be determined using a lexicography model, such as a language. The lexicography model may include a frequency of use of symbols in a language. For example, characters or symbols that are unlikely to occur immediately proximate to one another or immediately after one another in a set of symbols that the user may enter may be grouped on a respective icon 312 (FIG. 3B). A language may include slang as well as individual usage (for example, words that are commonly used by the user). The lexicography model may correspond to a user usage or word history that occurs prior to the user making contact with the device 300, i.e., a past usage.

As shown in FIG. 3B, when a user makes contact 314 with the touch screen 208 in the device 300 corresponding to the respective icon 312 and a respective symbol (in this case a letter 'a'), the shape of the respective icon 312 is modified. This provides information to the user as to which icon and which symbol the contact 314 currently corresponds. This may be useful since the contact 314 may obscure at least a portion of the respective icon 312 making it difficult for the user to see the respective symbol he or she is currently positioned on.

In an exemplary embodiment, the icons in the keyboard 310 may at least in part include an arc. In response to the contact 314, the shape of the respective icon 312 may be asymmetrically distorted and the respective symbol that the contact 314 currently corresponds to may be displayed within the shape of the respective icon 312 and outside of the contact 314.

In some embodiments, the user may select the respective symbol by making the contact 314 with the respective icon 312 and rolling a finger over a region within the respective icon 312 that corresponds to the respective symbol. If the user determines, based on the modified shape of the respective icon 312 and/or the displayed symbol within the modified shape that the wrong symbol is currently contacted, the user may roll their finger to a different position within the respective icon 312 that corresponds to the correct symbol. Once the contact 314 has been positioned over or proximate to the correct symbol, the user may select this symbol by breaking the contact 314 with the respective icon 312. The selected symbol (such as the letter 'a') may then be displayed in the display tray 214. In some embodiments, if the contact 314 is maintained by the user for a time interval that is more than a first pre-determined value, such as 0.5, 1 or 2 s, before the contact 314 is broken, the respective symbol may be capitalized.

If an error has been made, the user may clear the entire display tray 214 using a clear icon or may delete a most recently selected symbol using a delete icon. Once a set of symbols (such as a message) has been entered, the user may accept the set of symbols (which may store and/or send the set of symbols depending on the application executing on the device 300) using an accept icon.

As shown in FIG. 3C, in some embodiments an additional visual indicator corresponding to the respective icon 312 may be provided on the display 208. The visual indicator may be proximate to the respective icon 312. The visual indicator may include a band 318 around at least a portion of the respective icon 312.

As is also shown in FIG. 3C, in some embodiments a shape of the respective icon 312 may not be modified in response to the contact 314. Instead, an icon 316 corresponding to the respective symbol 316 may be displayed proximate to the respective icon 312.

The modifying of the shape of the respective icon 312 and/or the displaying of the visual indicator, such as the band 318 and/or the icon 316, may be included in at least some of the embodiments discussed further below.

While the device 300 has been illustrated with certain components and a particular arrangement of these components, it should be understood that there may be fewer or more components, two or more components may be combined, and positions of one or more components may be changed. For example, the keyboard 310 may include fewer or additional icons. In some embodiments, a different character set and/or different groups of symbols may be used on the icons in the keyboard 310.

Figure 4:
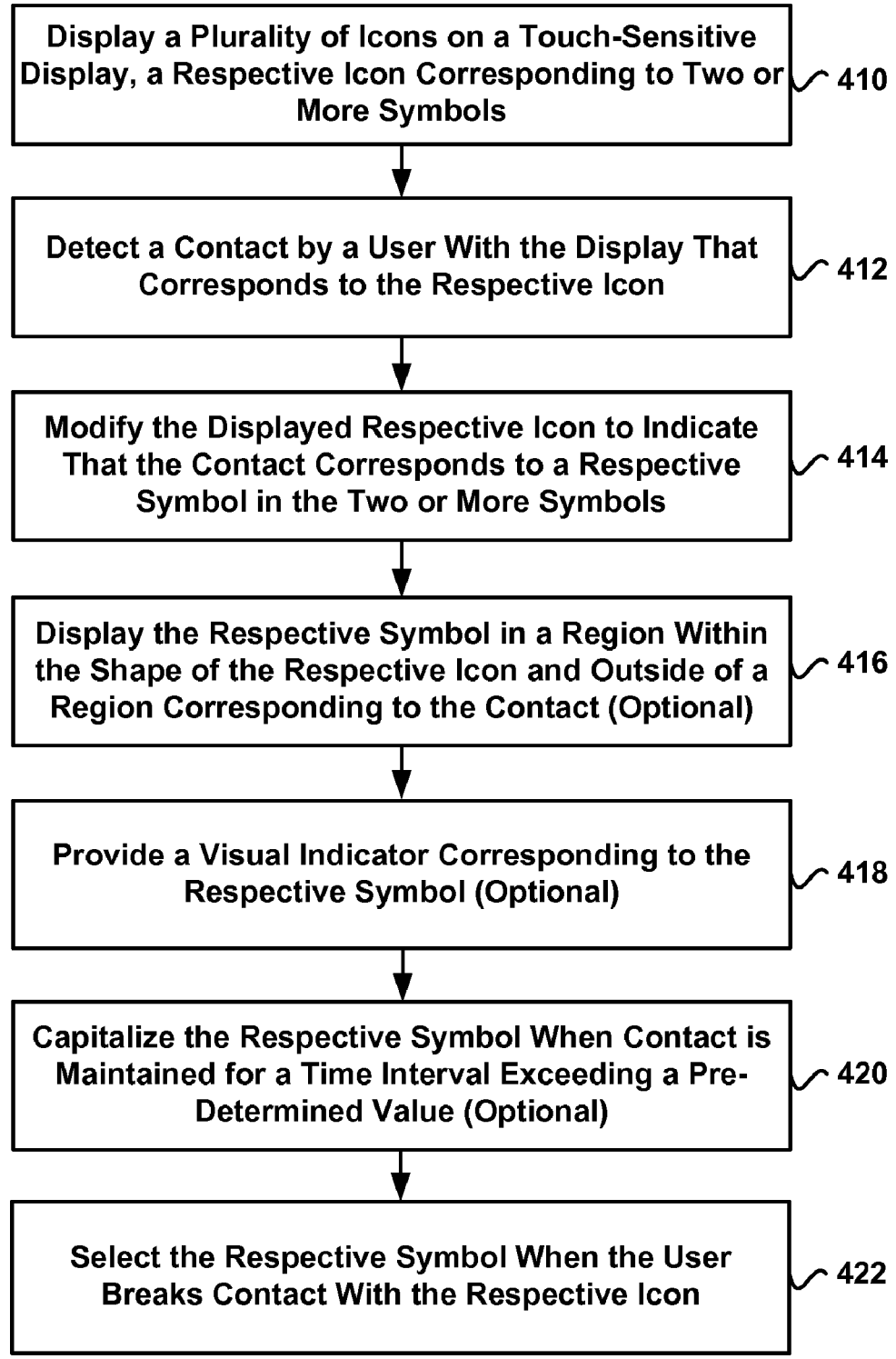
FIG. 4 is a flow diagram of an embodiment of a symbol entry process.

FIG. 4 is a flow diagram of an embodiment of a symbol entry process 400. While the symbol entry process 400 described below includes a number of operations that appear to occur in a specific order, it should be apparent that the process 400 can include more or fewer operations, which can be executed serially or in parallel (e.g., using parallel processors or a multi-threading environment), an order of two or more operations may be changed and/or two or more operations may be combined into a single operation.

A plurality of icons may be displayed on a touch-sensitive display (410). A respective icon may correspond to two or more symbols. Contact by a user with the display that corresponds to the respective icon may be detected (412). The displayed respective icon may be modified to indicate that the contact corresponds to a respective symbol in the two or more symbols (414). The respective symbol may be optionally displayed in a region within the shape of the respective icon and outside of a region corresponding to the contact (416). A visual indicator corresponding to the respective symbol may be optionally provided (418). The respective symbol may be optionally capitalized when contact is maintained for a time interval exceeding a pre-determined value (420). The respective symbol may be selected when the user breaks contact with the respective icon (422).

Figure 5:
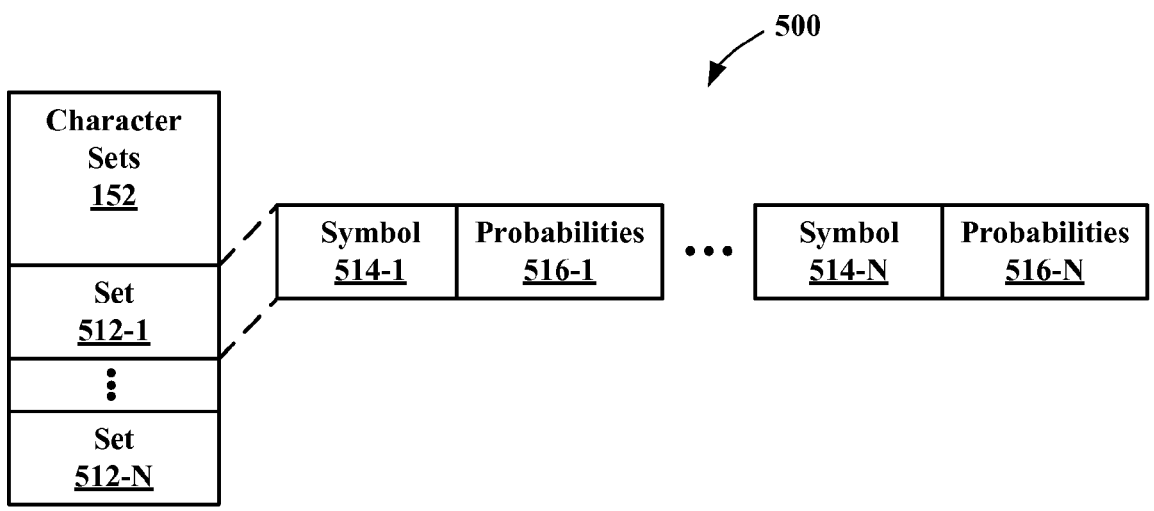
FIG. 5 is a block diagram illustrating an embodiment of a character set data structure.

Attention is now directed towards embodiments of a character set data structure that may be used in implementing the user interface in the device 300 (FIG. 3) and/or user interfaces described further below. FIG. 5 is a block diagram illustrating an embodiment of a character set data structure 500. The character sets 152 may include multiple sets 512 of characters and/or symbols. A respective set, such as the set 512-1, may include one or more symbols 514 and one or more probabilities 516. The probabilities may include frequencies of occurrence of use, as well as conditional probabilities (such as the probability of a given symbol occurring given one or more symbols that have already occurred). In some embodiments the character set data structure 500 may include fewer or more components. Two or more components may be combined and an order of two or more components may be changed.

Attention is now directed towards additional embodiments of user interfaces and associated processes that may be implemented on the device 100 (FIG. 1). FIGS. 6A-6D are schematic diagrams illustrating an embodiment of a user interface for a portable electronic device 600. The device 600 includes a keyboard 610 that has a plurality of icons arranged in rows. A given row includes a subset of the plurality of icons. Adjacent rows are separated by a space greater than a second pre-determined value, such as a height of one of the icons.

Figure 6A:
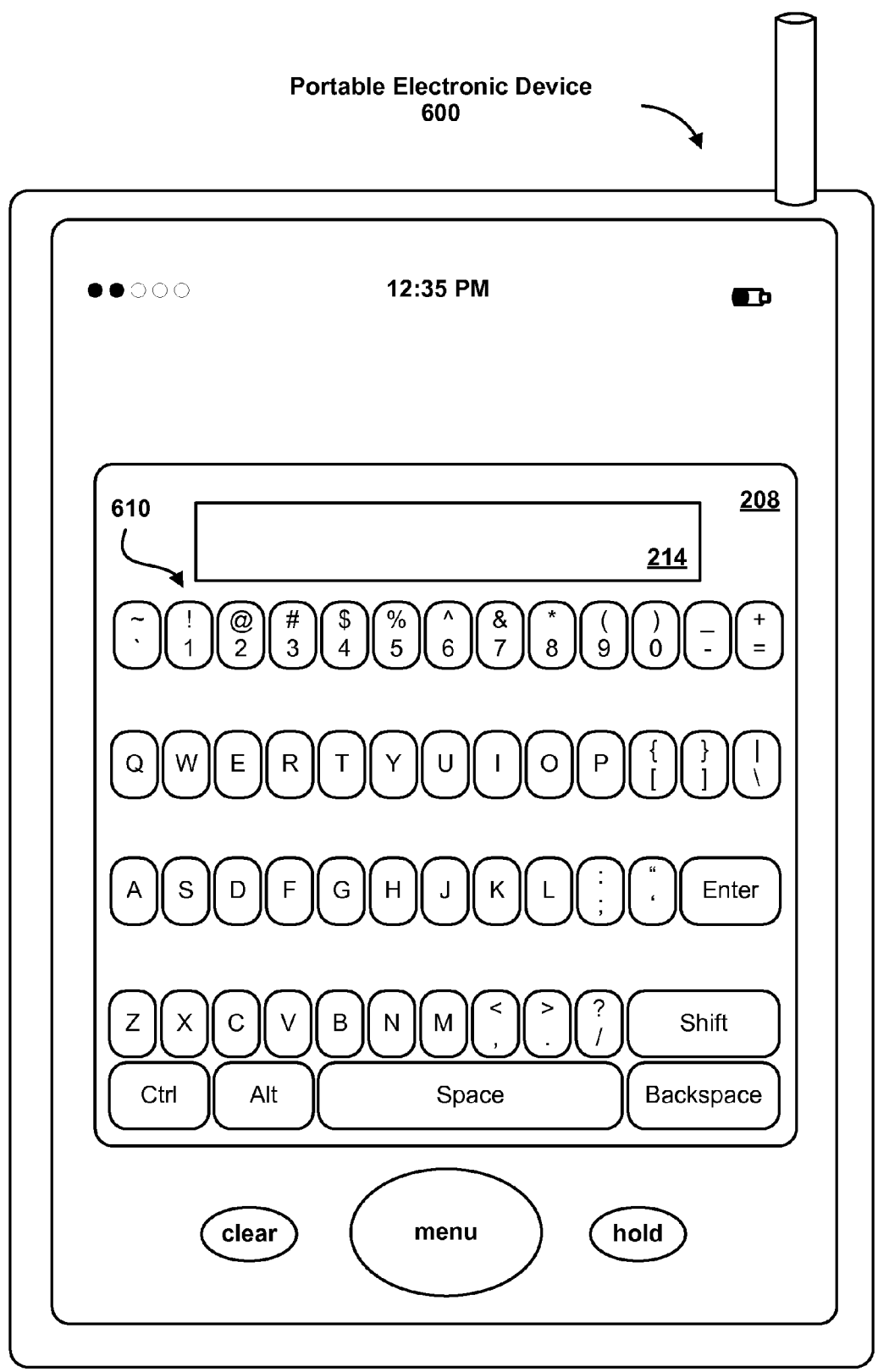
FIG. 6A is a schematic diagram illustrating an embodiment of a user interface for a portable electronic device.
Figure 6B:
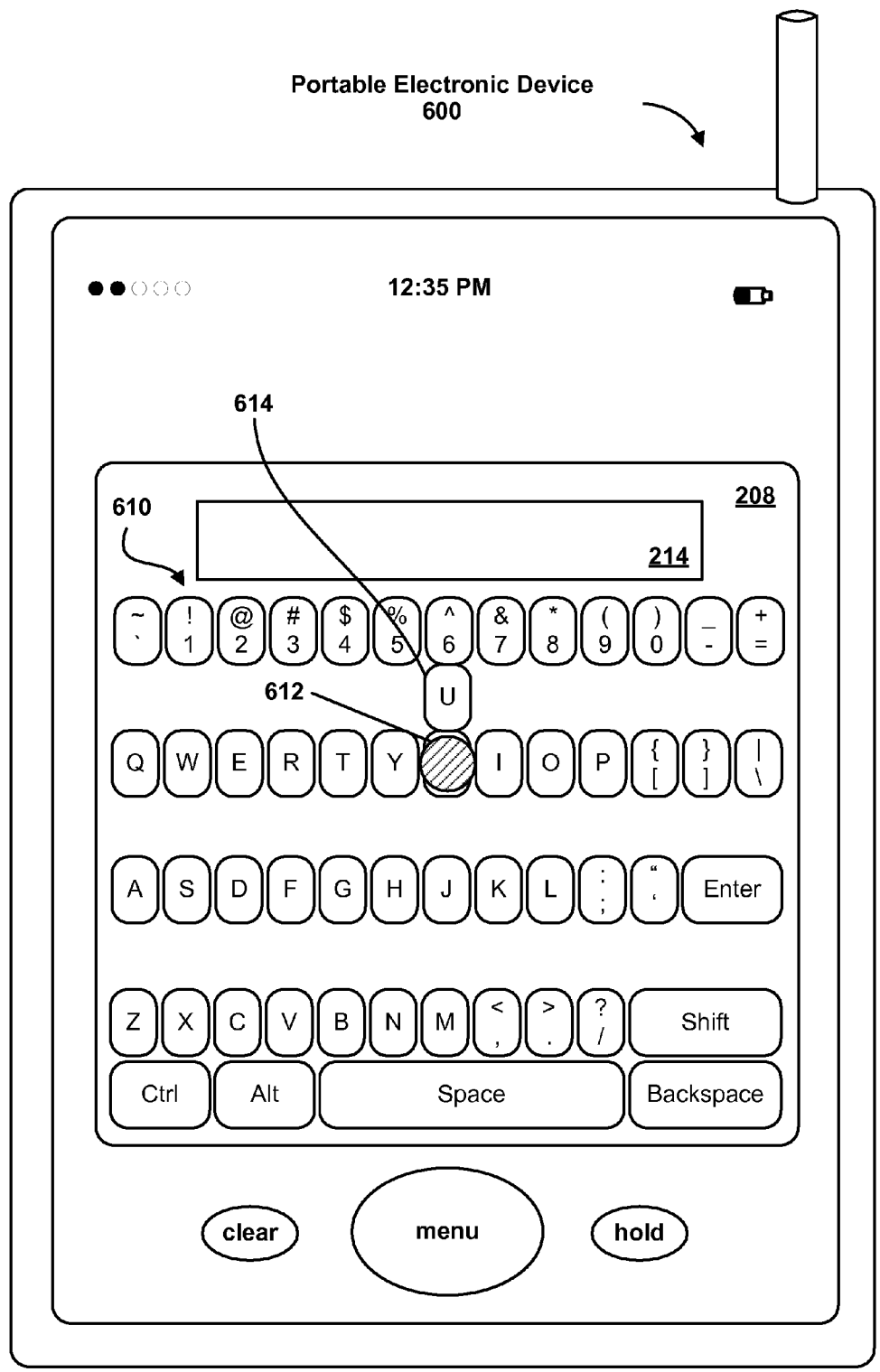
FIG. 6B is a schematic diagram illustrating an embodiment of a user interface for a portable electronic device.

As shown in FIG. 6B, when the user makes a contact 612 with the display 208 corresponding to a respective icon in the keyboard 610, an icon 614 may be displayed in the space between two adjacent rows. The icon may correspond to a respective symbol that corresponds to the respective icon that the user has contacted 612. For example, if the user contacts or is proximate to an icon for the character 'u' in the keyboard 610, the icon 614 may correspond to the character 'u'. In this way, the user may receive feedback that the respective icon (and thus, the respective symbol) is currently contacted. This may be useful because the contact 612 may obscure the respective icon, and thus, the respective symbol, that has been selected in the rows of icons.

In some embodiments, the icon 614 may be displayed above a respective row in which the contact 612 has occurred. In some embodiments, the icon 614 may be magnified, i.e., larger, than the respective icon.

The icon 614 may be displayed while the contact 612 is maintained. When the user breaks the contact 612 with the respective icon, the respective symbol may be selected. In some embodiments, the respective symbol may be displayed in the display tray 214.

Figure 6C:
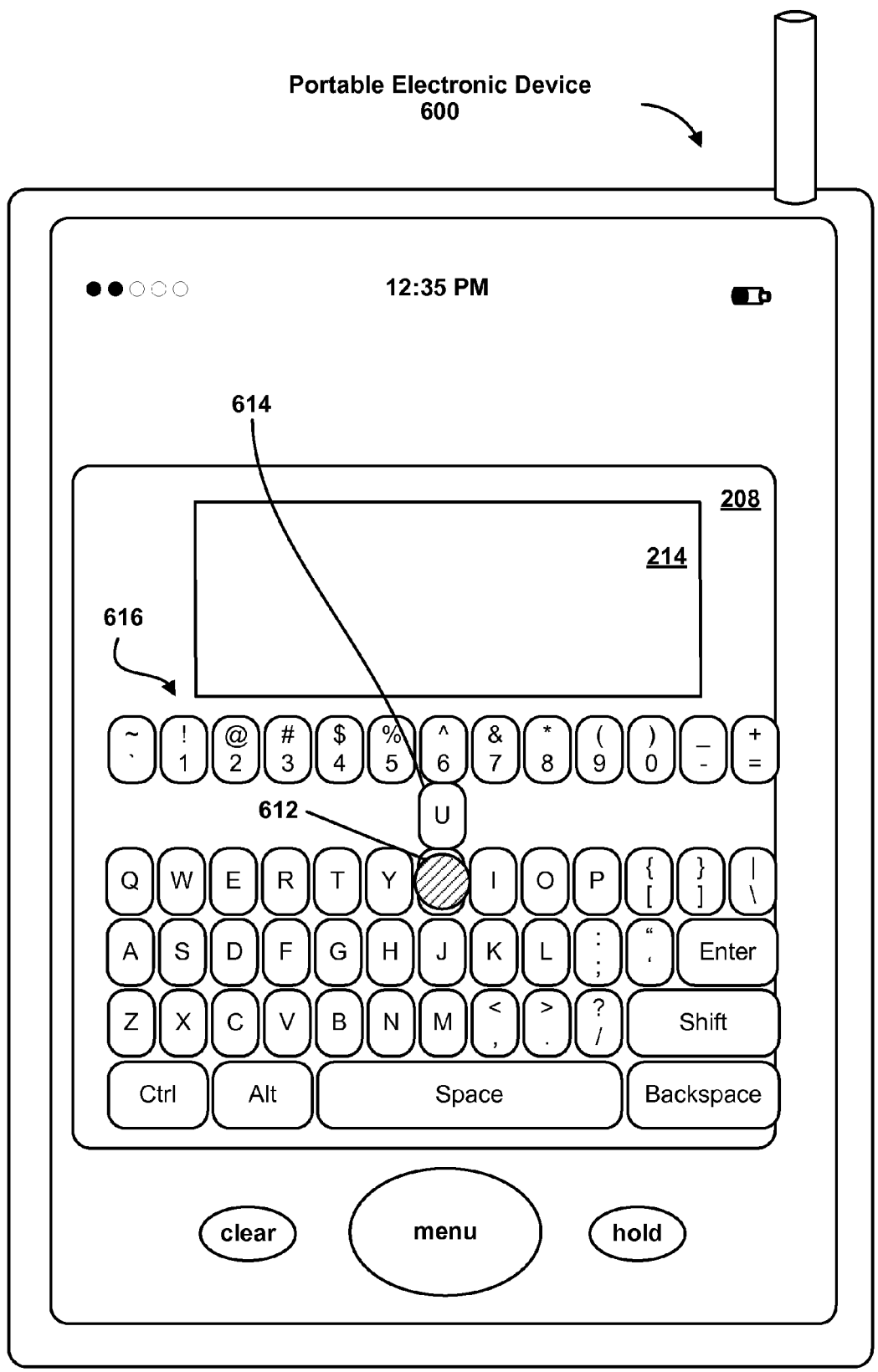
FIG. 6C is a schematic diagram illustrating an embodiment of a user interface for a portable electronic device.

As shown in FIG. 6C, in some embodiments a keyboard 616 may be displayed with rows of icons. Initially, the rows of icons may not include a significant space between adjacent rows, e.g., the space may be less than the second pre-determined value. When the user makes the contact 612 with the display 208, however, the displayed keyboard 616 may be modified to include a space greater the second pre-determined value and the icon 614 may be displayed. This modified configuration or layout of the keyboard 616 may be maintained while the contact 612 is maintained by the user.

Figure 6D:
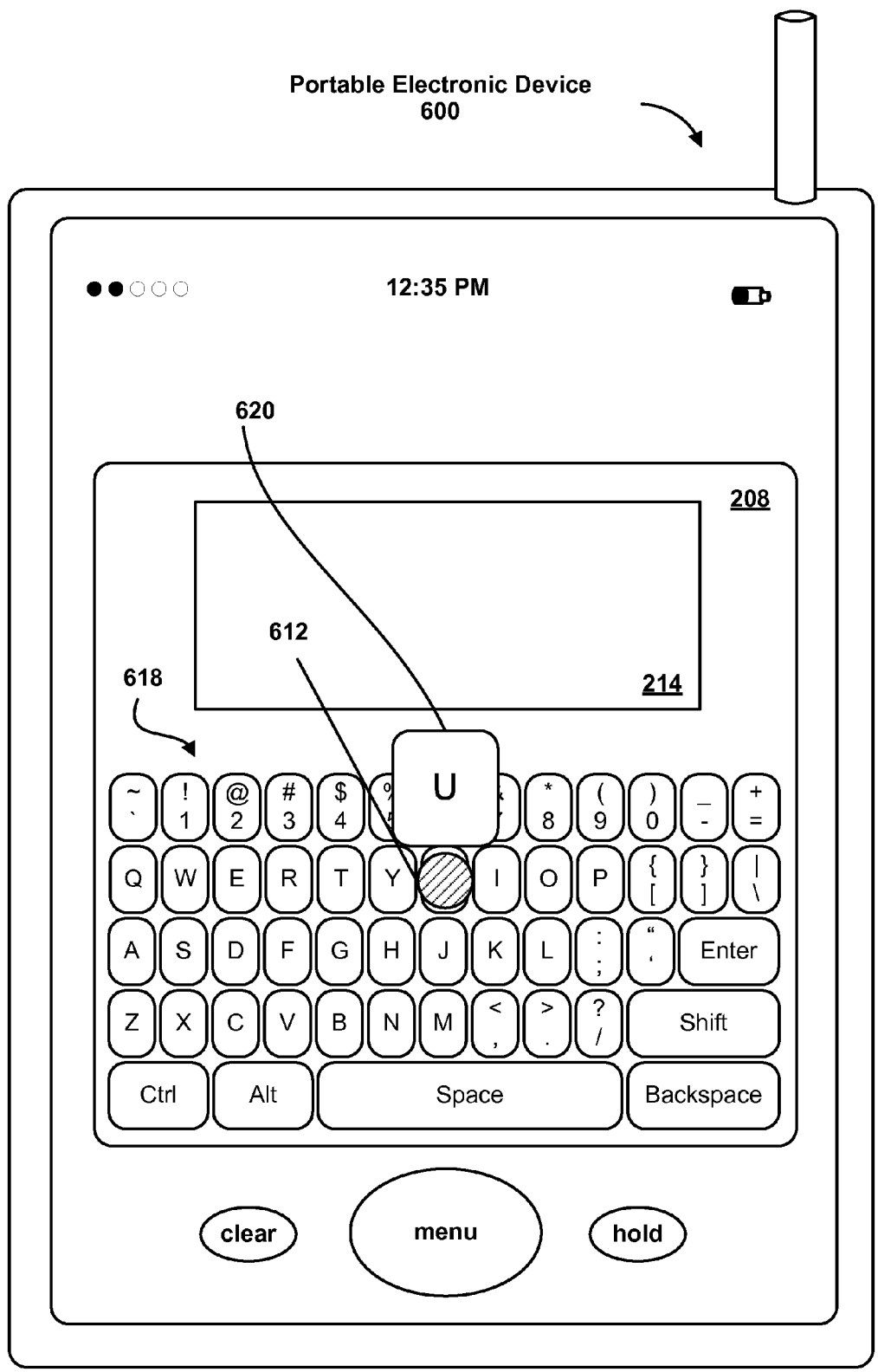
FIG. 6D is a schematic diagram illustrating an embodiment of a user interface for a portable electronic device.

As shown in FIG. 6D, in some embodiments a keyboard 618 may include rows of icons. When the contact 612 is made, an icon 620 may be displayed superimposed over at least one or more additional icons in the keyboard 618.

While the device 600 has been illustrated with certain components and a particular arrangement of these components, it should be understood that there may be fewer or more components, two or more components may be combined, and positions of one or more components may be changed. For example, the keyboards 610, 616 and/or 618 may include fewer or additional icons. In some embodiments, a different character set and/or different groups of symbols may be used on the icons in the keyboards 610, 616 and/or 618.

Figure 7:
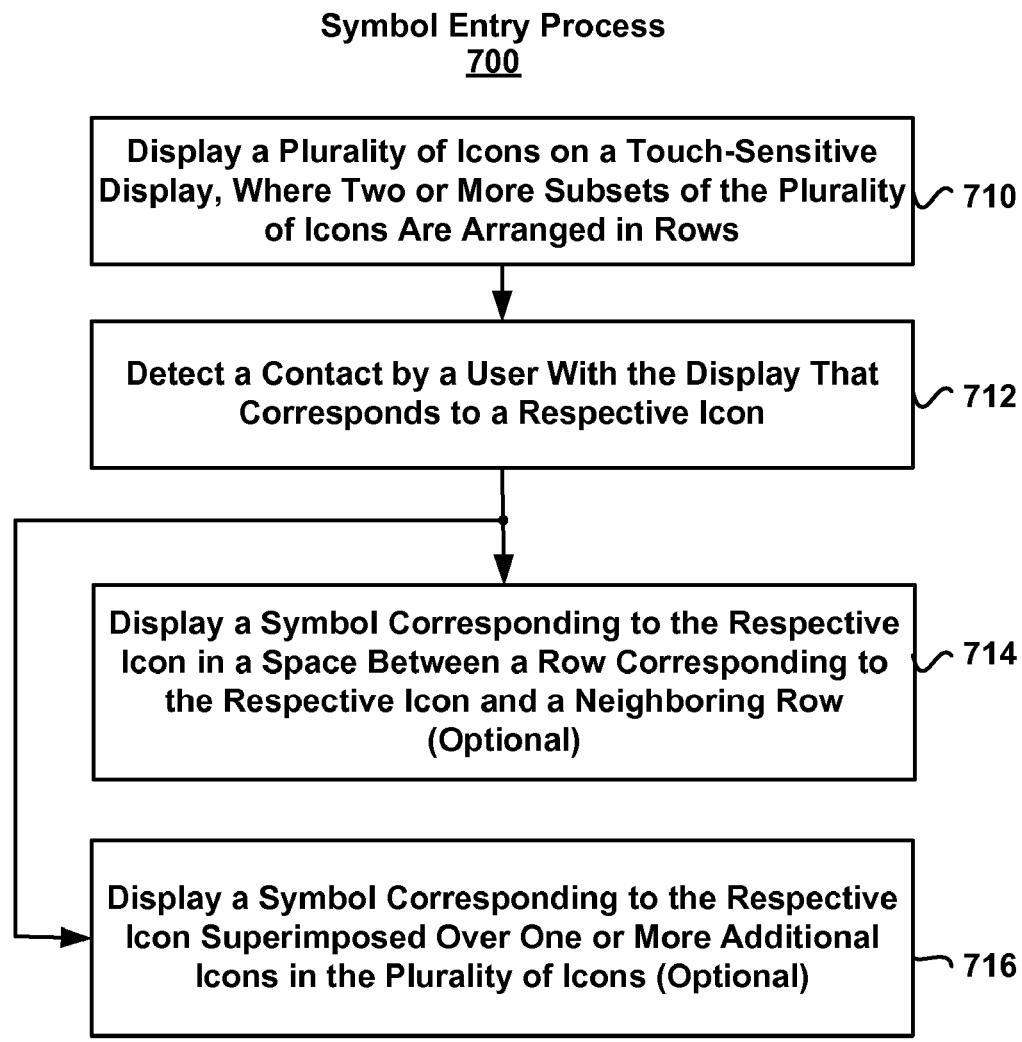
FIG. 7 is a flow diagram of an embodiment of a symbol entry process.

FIG. 7 is a flow diagram of an embodiment of a symbol entry process 700. While the symbol entry process 700 described below includes a number of operations that appear to occur in a specific order, it should be apparent that the process 700 can include more or fewer operations, which can be executed serially or in parallel (e.g., using parallel processors or a multi-threading environment), an order of two or more operations may be changed and/or two or more operations may be combined into a single operation.

A plurality of icons may be displayed on a touch-sensitive display (710). Two or more subsets of the plurality of icons may be arranged in rows. A contact by a user with the display that corresponds to a respective icon may be detected (712). A symbol corresponding to the respective icon may be optionally displayed between a row corresponding to the respective icon and a neighboring row (714). A symbol corresponding to the respective icon may be optionally displayed superimposed over one or more additional icons in the plurality of icons (716).

Figure 8:
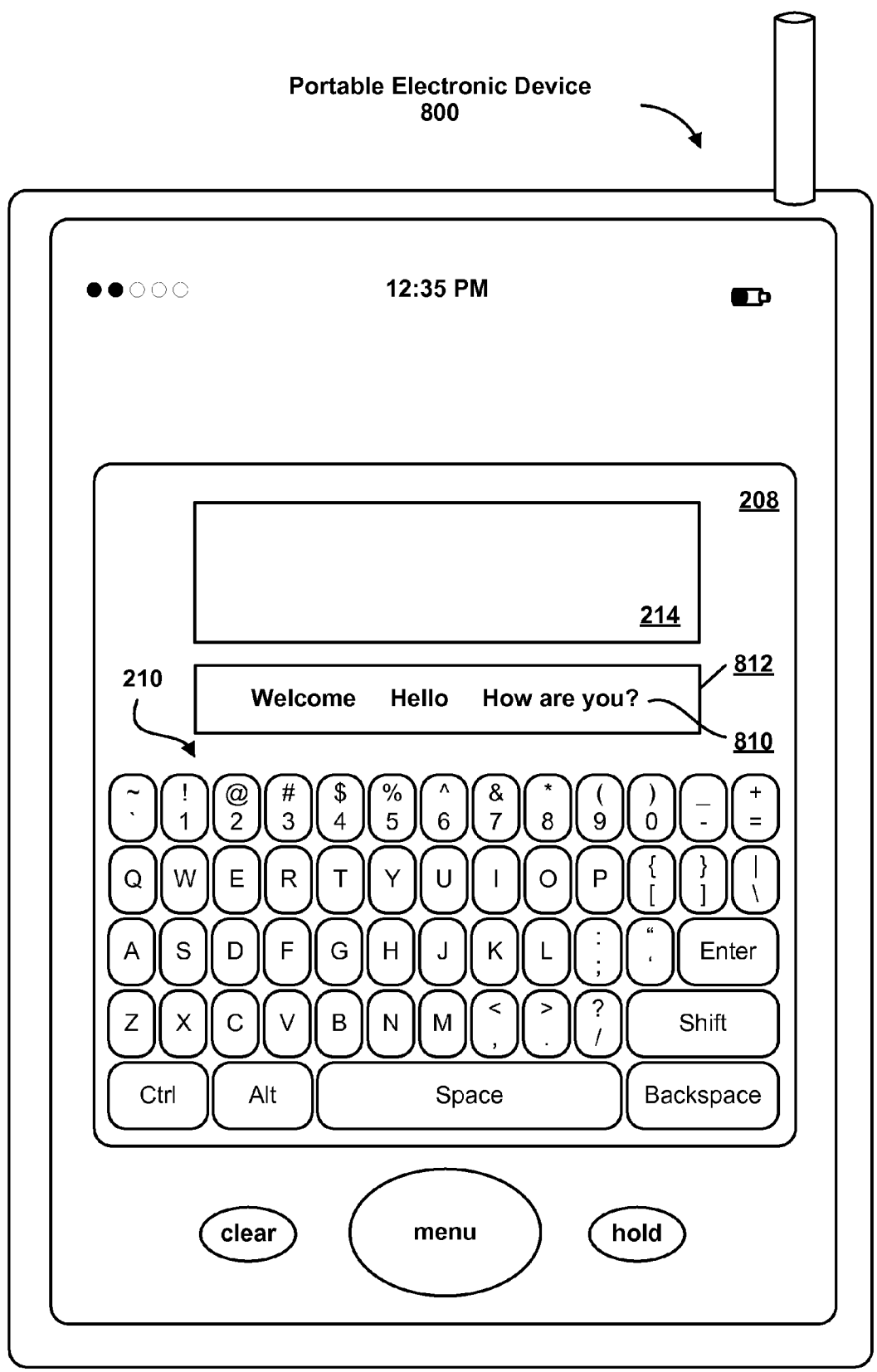
FIG. 8 is a schematic diagram illustrating an embodiment of a user interface for a portable electronic device.

FIG. 8 is a schematic diagram illustrating an embodiment of a user interface for a portable electronic device 800. The device 800 may include a tray 812 that includes one or more recommended words 810. The one or more recommended words 810 may be determined using a user word history. This is discussed further below with reference to FIGS. 10A and 10B.

In some embodiments, the one or more recommended words 810 are displayed prior to detecting any contacts corresponding to text input (symbol selection) by the user in a current application session. For example, the one or more recommended words 810 may be displayed when the user initially opens an application, such as email, on the device 800. The one or more recommended words 810, therefore, may be determined based on a user word or usage history that may be application specific. After the device 800 receives contacts corresponding to text input, the one or more recommended words 810 may change dynamically in response to contacts corresponding to text input by the user during the application session.

The user may select one or more of the recommended words 810 by making contact with the display 208. In some embodiments, one or more of the recommended words 810, such as a phrase ("How are you?"), may be selected with a single contact. The contact may include a gesture, such as one or more taps, one or more swipes, and/or a rolling motion of a finger that makes the contact. The one or more taps may have a duration that is less than a third pre-determined value, such as 0.1, 0.5 or 1 s.

While the device 800 has been illustrated with certain components and a particular arrangement of these components, it should be understood that there may be fewer or more components, two or more components may be combined, and positions of one or more components may be changed. For example, the keyboard 210 may include fewer or additional icons. In some embodiments, a different character set and/or different groups of symbols may be used on the icons in the keyboard 210.

Figure 9:
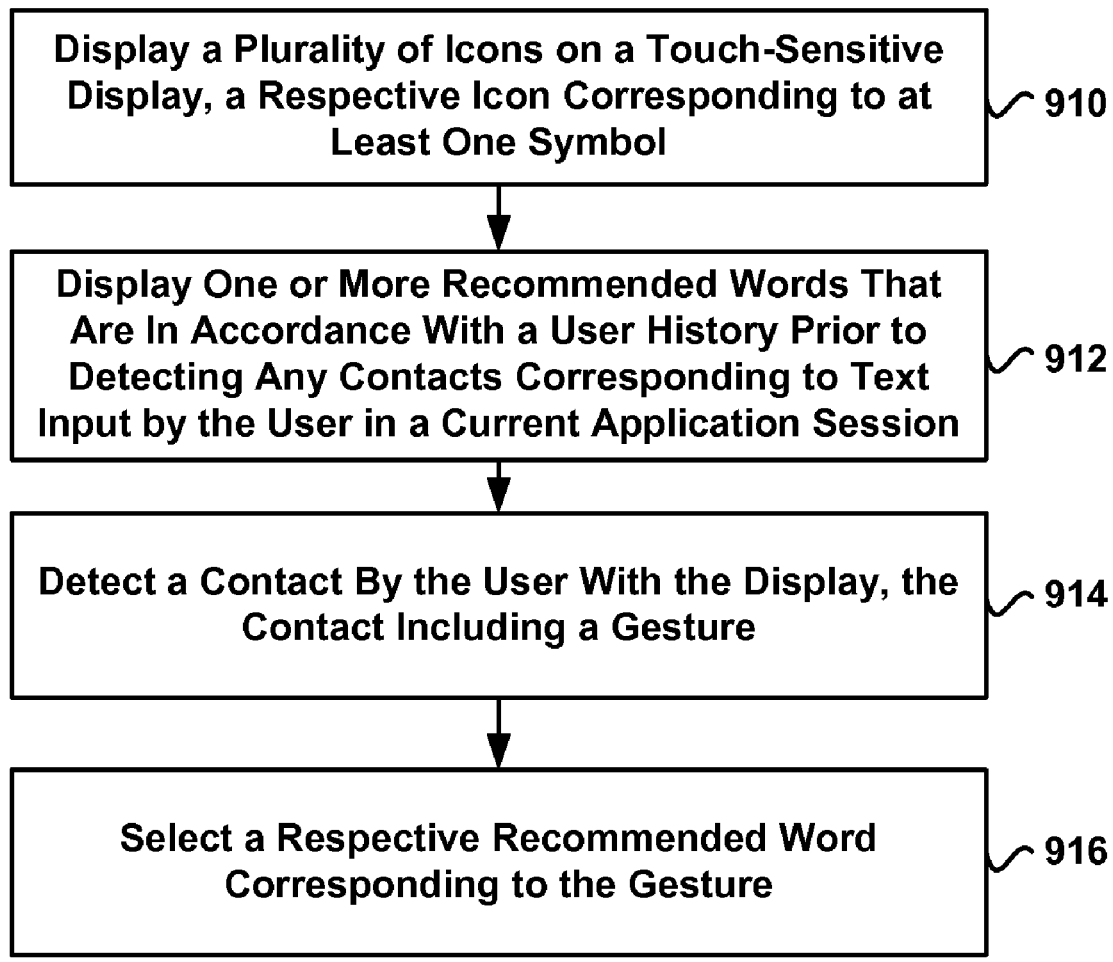
FIG. 9 is a flow diagram of an embodiment of a symbol entry process.

FIG. 9 is a flow diagram of an embodiment of a symbol entry process 900. While the symbol entry process 900 described below includes a number of operations that appear to occur in a specific order, it should be apparent that the process 900 can include more or fewer operations, which can be executed serially or in parallel (e.g., using parallel processors or a multi-threading environment), an order of two or more operations may be changed and/or two or more operations may be combined into a single operation.

A plurality of icons may be displayed on a touch-sensitive display (910). A respective icon may correspond to at least one symbol. One or more recommended words may be displayed (912). The one or more recommended words may be in accordance with a user history prior to detecting any contacts corresponding to text input (symbol selection) by the user in a current application session. A contact by the user with the display may be detected (914). The contact may include a gesture. A respective recommended word that corresponds to the gesture may be selected (916).

Figure 10A:
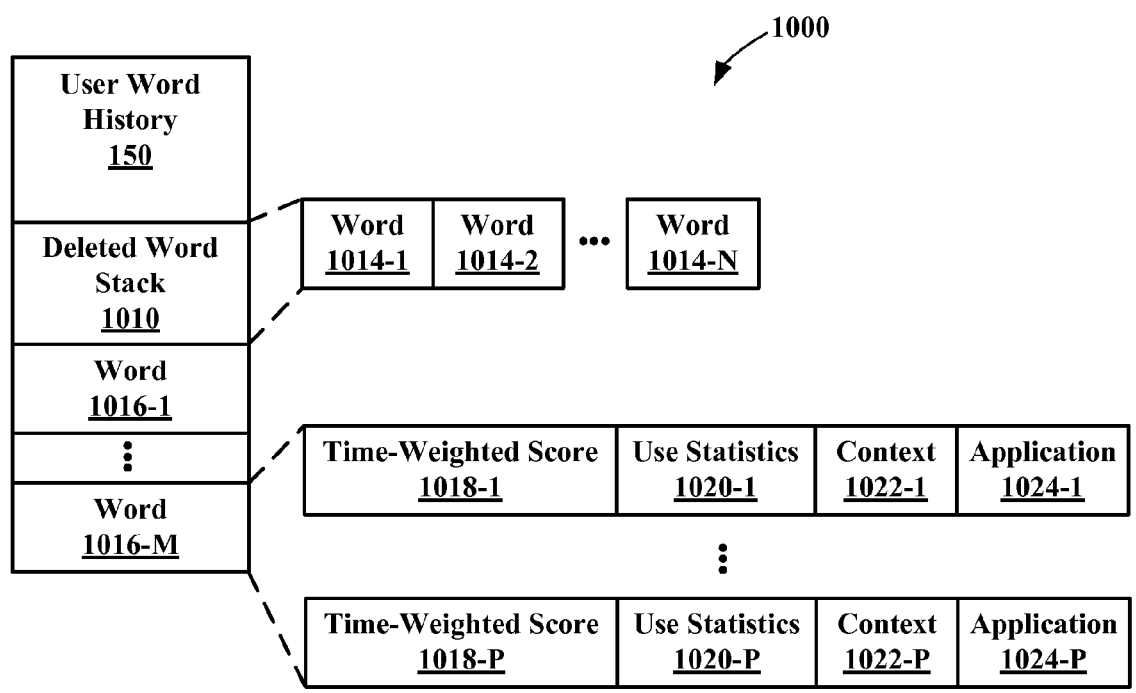
FIG. 10A is a block diagram illustrating an embodiment of a user word history data structure.

Attention is now directed towards embodiments of data structure systems that may be implementing in the device 100 (FIG. 1). FIG. 10A is a block diagram illustrating an embodiment of a user word history data structure 1000. The user word history 150 may include a deleted word stack 1010 and multiple words 1016. The words 1016 may include one or more characters and/or one or more symbols. The deleted word stack 1010 includes one or more words 1014 in a sequential order in which the one or more words 1014 were deleted by the user in an application, such as the text messaging module 140 (FIG. 1).

A respective word in the words 1016, such as word 1016-M, may include multiple records. A respective record may include a time-weighted score 1018, use statistics 1020 (such as a time of use and/or a frequency of use), a context 1022 and one or more applications 1024. The time-weighted score 1018 may indicate a probability that the word 1016-M is a next predicted word based on the context 1022 (one or more characters, symbols and/or words that have previously been provided by the user) and/or the application 1024. For example, the time-weighted score 1018 may therefore be different for email than for the text messaging module 140 (FIG. 1). The time-weighted score 1018 may be computed to favorably weight (e.g., give a higher probability) to words that are used recently. For example, the time-weighted score 1018 may give favorable weighting to words 1016 that are used within the last 24 hours or week. Words 1016 used on longer time scales (e.g., more than a day or a week ago) may have their corresponding time-weighted scores 1018 reduced by a pre-determined ratio (such as 0.9) for each additional time interval (e.g., each day or week) since the words 1016 were last used.

The user history data structure 1000 may include static information (for example, corresponding to a dictionary and/or grammatical and syntax rules for one or more languages) as well as dynamic information (based on recent usage statistics and/or patterns). Thus, the user history data structure 1000 may be dynamically updated continuously, after pre-determined time intervals, or when a new word or syntax is employed by the user. The user history data structure 1000 may include a static dictionary built up by scanning a user's address book, emails, and other documents. In some embodiments the user history data structure 1000 may include fewer or more components. Two or more components may be combined and an order of two or more components may be changed.

Figure 10B:
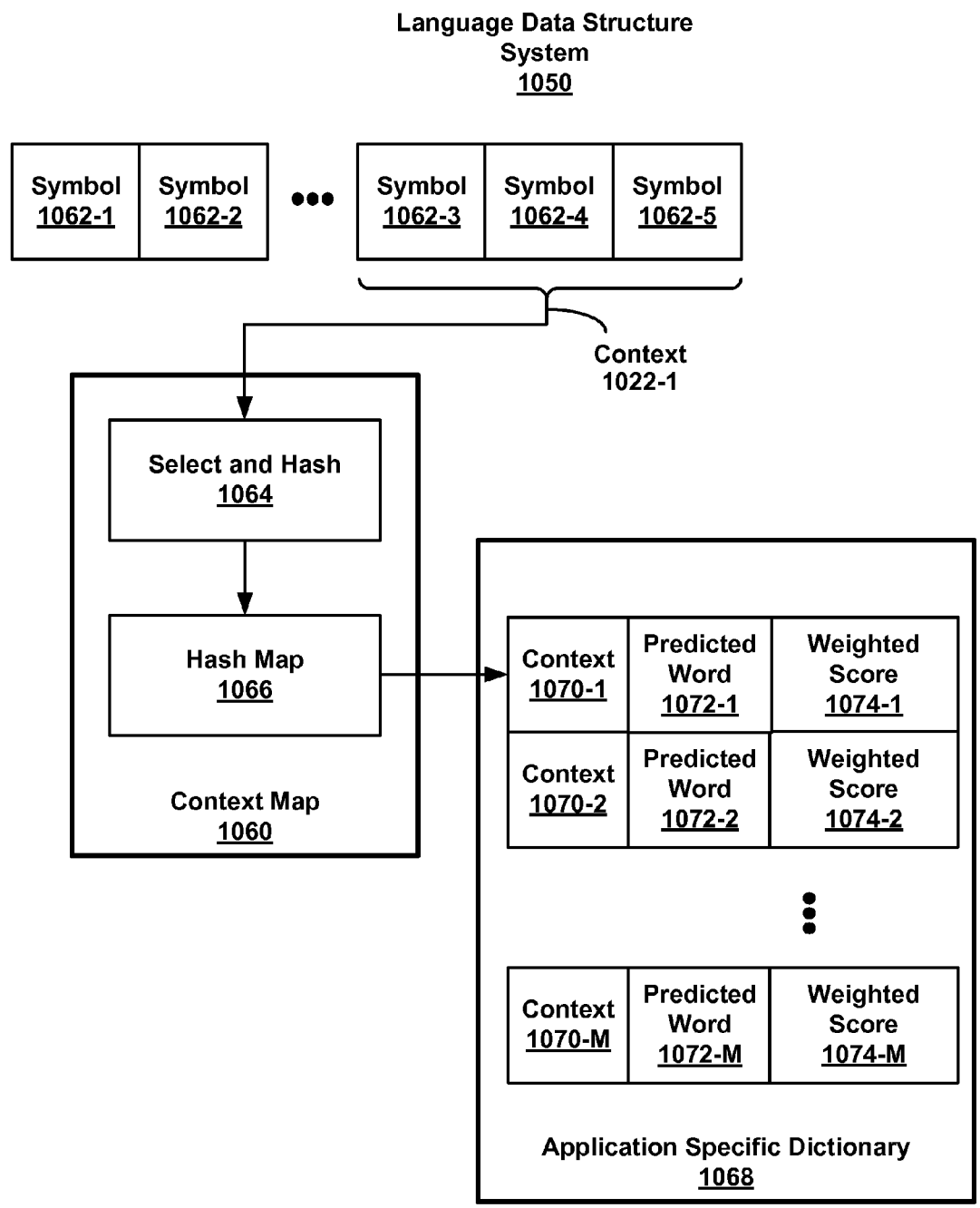
FIG. 10B is a block diagram illustrating an embodiment of a language data structure system.

FIG. 10B is a block diagram illustrating an embodiment of a language data structure system 1050. The language data structure system 1050 may be used to provide recommended words in the device 800 (FIG. 8). A sequence of symbols 1062 (including one or more characters, symbols and/or words) may be provided by the user. A set of symbols 1062 corresponding to a context 1022-1 may be processed by a context map 1060. In some embodiments, the context 1022-1 may be a null set, i.e., one or more recommended words are provided before the user provides any symbols 1062 (e.g., when an application is first opened). In other embodiments, the context 1022-1 may include one or more previously entered or provided words as well as one or more symbols, such as the first one, two or three letters in a current word that the user is providing. The context map 1060 may include a select and hashing module 1064 and a hash map 1066. The hash map 1066 may select one or more appropriate entries in an application-specific dictionary 1068. The entries in the application-specific dictionary 1068 may include contexts 1070, predicted words 1072, and time-weighted scores 1074. The application-specific dictionary 1068 may utilize the records in the user history data structure 1000. As a consequence, the application-specific dictionary 1068 may be dynamically updated continuously, after pre-determined time intervals, or when a new word or syntax is employed by the user.

The language data structure system 1050 may be used to provide one or more recommended words based on the context 1022-1. The context map may find a top-5 or top-10 best context 1070 matches. The corresponding predicted words 1072 may be recommended to the user in accordance with the time-weighted scores 1074. In some embodiments, only a subset of the predicted words 1072 corresponding to the best context 1070 matches may be presented to the user (e.g., just the top-1, top-2, or top-3 predicted words).

In some embodiments, the language data structure system 1050 may provide one or more recommended words in accordance with a state machine (corresponding to a Markov sequence or process) that corresponds to a language. For example, the application-specific dictionary 1068 may be based on a stochastic model of the relationships among letters, characters, symbols and/or words in a language.

A path memory (such as up to three characters in a word that is currently being entered and/or two or three previously entered words) of the probabilistic model represents a tradeoff between accuracy and the processing and power capabilities (for example, battery life) of the portable electronic device 100 (FIG. 1). In some embodiments, such a probabilistic model may be based on a lexicography and usage that is user-specific and/or, as discussed previously, even application specific. For example, user emails, address book and/or other documents may be analyzed to determine an appropriate probabilistic model for that user based on the syntax and/or lexicography (including names and slang) that are employed by the user. The probabilistic model may be updated continuously, after pre-determined time intervals, or when a new word or syntax is employed by the user.

In some embodiments, the probabilistic model may be based on one or more mistakes made by the user when using the click wheel 114 (FIG. 1) and/or a touch-sensitive display in the display system 112 (FIG. 1). For example, if the user accidentally selects the wrong icon when typing a respective word, the probabilistic model may be updated to account for such errors in the future. In an exemplary embodiment, a mistake may be determined based on a user activation of an icon corresponding to the delete function. This adaptability of the portable electronic device 100 (FIG. 1) may allow correction of user interface errors (such as parallax and/or left-right symmetry) associated with which finger(s) the user is using and how the user is holding the portable electronic device 100 (FIG. 1) while using it. This functionality is discussed further below with reference to FIG. 14.

In some embodiments the language data structure system 1050 may include fewer or more components. Two or more components may be combined and an order of two or more components may be changed.

Figure 11A:
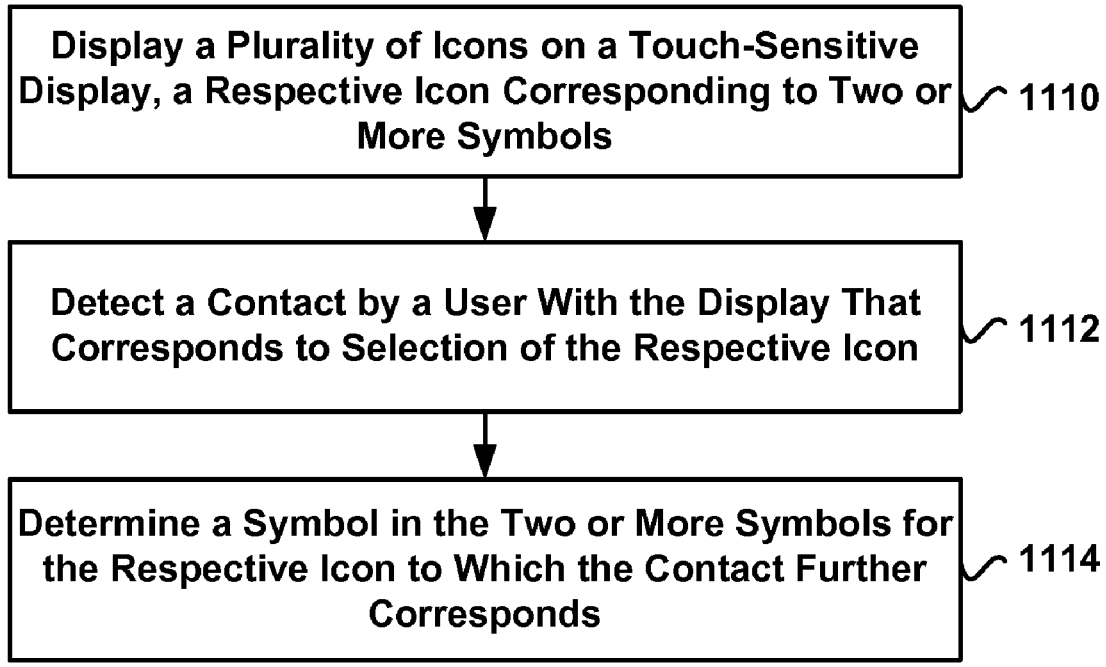
FIG. 11A is a flow diagram of an embodiment of a symbol entry process.

Attention is now directed towards additional embodiments of user interfaces and associated processes that may be implemented on the device 100 (FIG. 1). FIG. 11A is a flow diagram of an embodiment of a symbol entry process 1100. While the symbol entry process 1100 described below includes a number of operations that appear to occur in a specific order, it should be apparent that the process 1100 can include more or fewer operations, which can be executed serially or in parallel (e.g., using parallel processors or a multi-threading environment), an order of two or more operations may be changed and/or two or more operations may be combined into a single operation.

A plurality of icons may be displayed on a touch-sensitive display (1110). A respective icon may correspond to two or more symbols. A contact by a user with the display that corresponds to selection of the respective icon may be detected (1112). A symbol in the two or more symbols for which the contact further corresponds may be determined (1114).

FIG. 11B is a flow diagram of an embodiment of a symbol entry process 1130. While the symbol entry process 1130 described below includes a number of operations that appear to occur in a specific order, it should be apparent that the process 1130 can include more or fewer operations, which can be executed serially or in parallel (e.g., using parallel processors or a multi-threading environment), an order of two or more operations may be changed and/or two or more operations may be combined into a single operation.

A plurality of icons may be displayed on a touch-sensitive display (1132). A respective icon may correspond to two or more symbols. A first symbol may belong to a first subset of symbols and a second symbol may belong to a second subset of symbols. The first symbol may have a probability of occurrence greater than the second symbol. A contact by a user with the display that corresponds to selection of the respective icon may be detected (1134). A symbol in the two or more symbols for which the contact further corresponds may be determined (1136).

FIG. 11C is a flow diagram of an embodiment of a symbol entry process 1150. While the symbol entry process 1150 described below includes a number of operations that appear to occur in a specific order, it should be apparent that the process 1150 can include more or fewer operations, which can be executed serially or in parallel (e.g., using parallel processors or a multi-threading environment), an order of two or more operations may be changed and/or two or more operations may be combined into a single operation.

A plurality of icons may be displayed on a touch-sensitive display (1152). A respective icon may correspond to two or more symbols. A first symbol may belong to a first subset of symbols and a second symbol may belong to a second subset of symbols. The second symbol may have a probability of occurrence immediately following the first symbol that is less than a pre-determined value. A contact by a user with the display that corresponds to selection of the respective icon may be detected (1154). A symbol in the two or more symbols for which the contact further corresponds may be determined (1156).

Figure 12A:
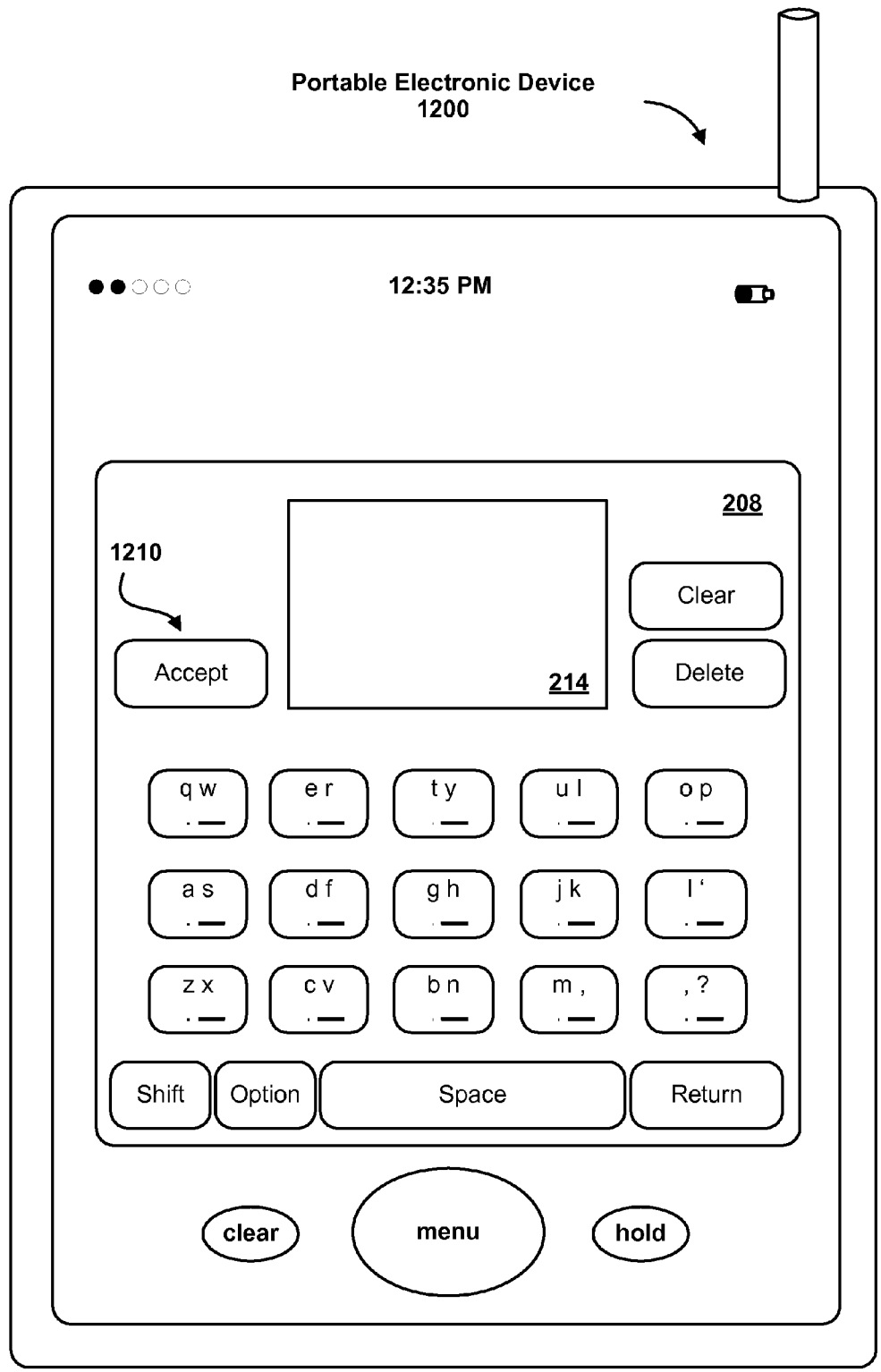
FIG. 12A is a schematic diagram illustrating an embodiment of a user interface for a portable electronic device.
Figure 12B:
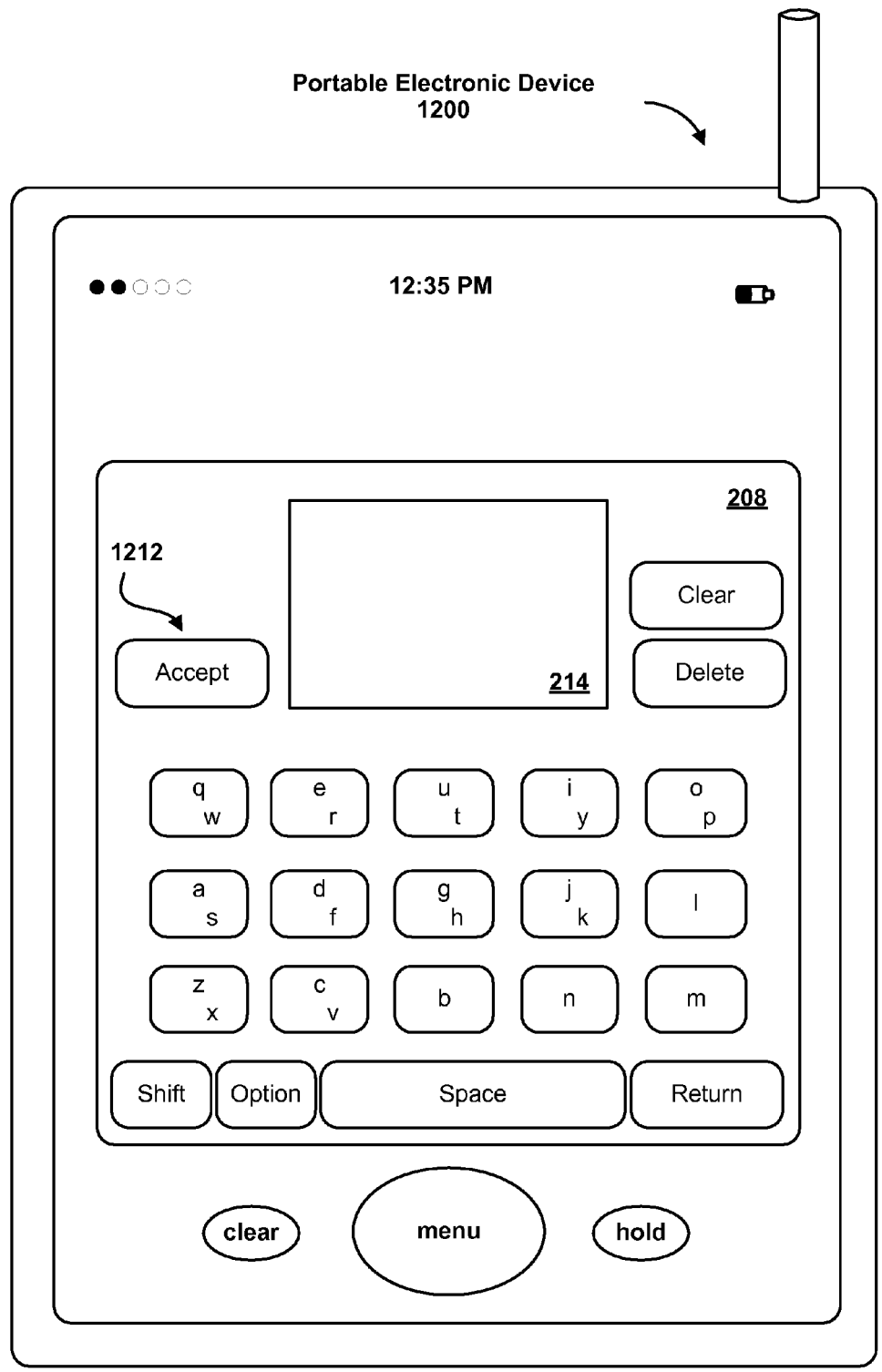
FIG. 12B is a schematic diagram illustrating an embodiment of a user interface for a portable electronic device.
Figure 12C:
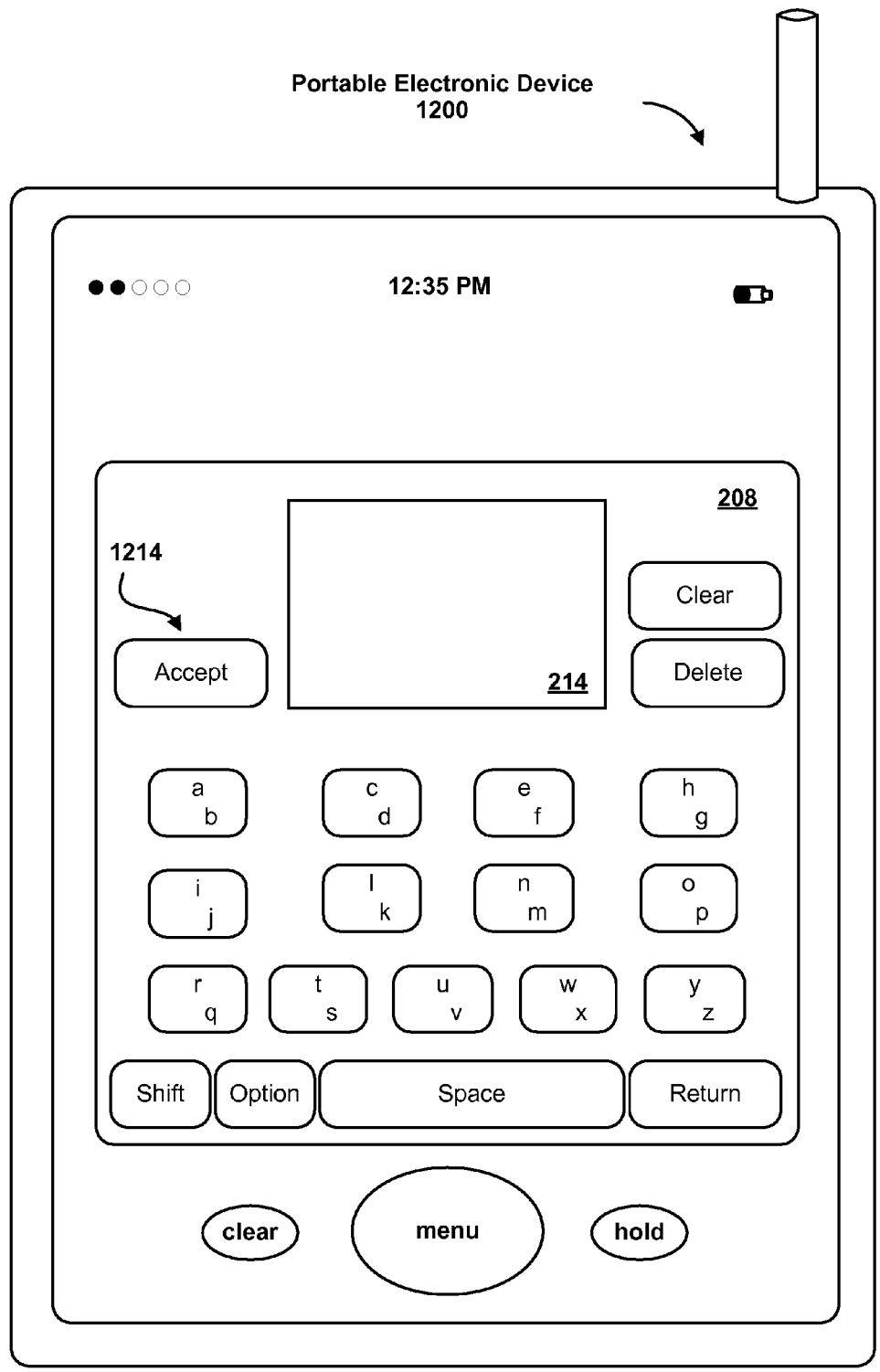
FIG. 12C is a schematic diagram illustrating an embodiment of a user interface for a portable electronic device.
Figure 12D:
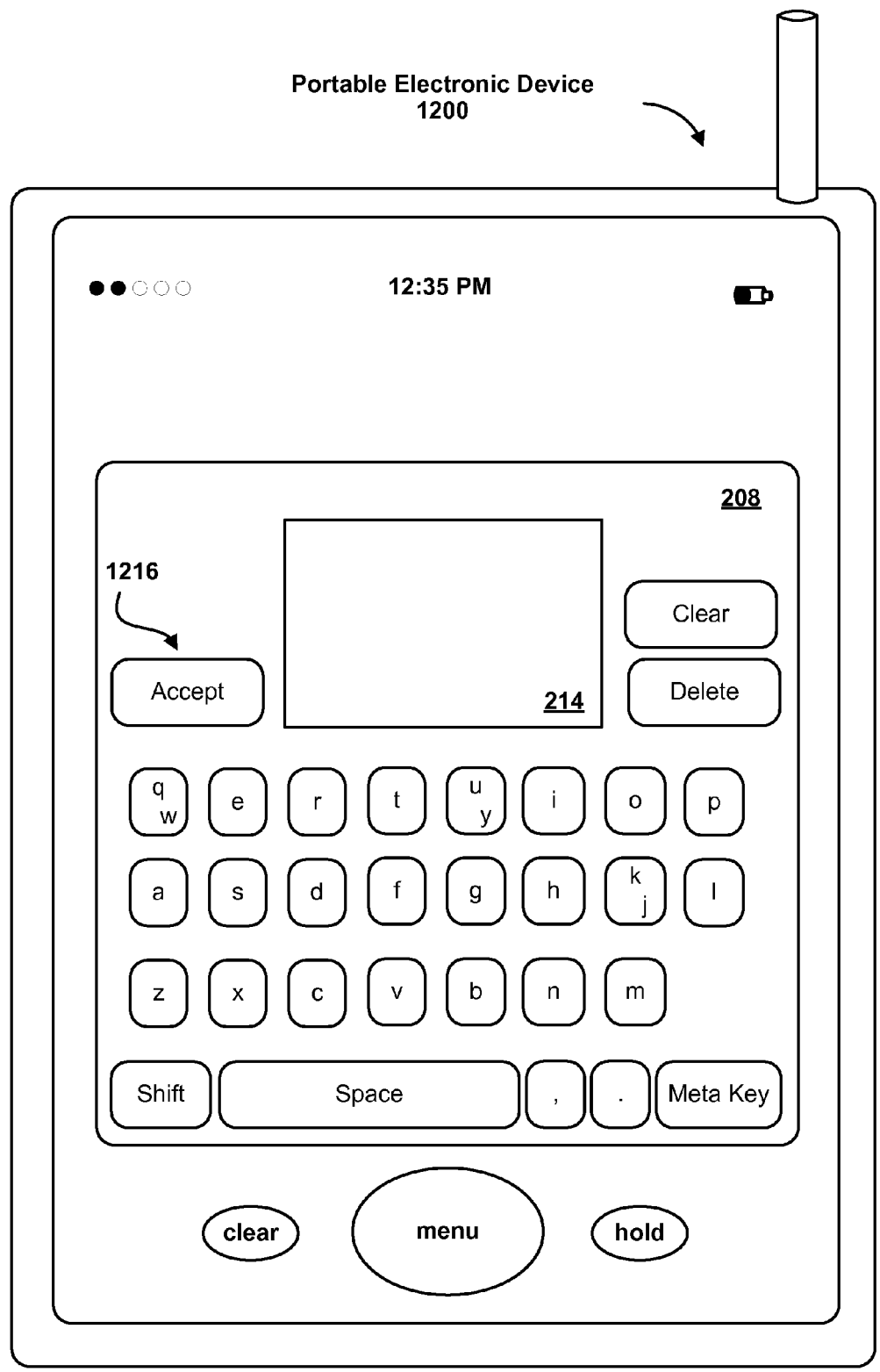
FIG. 12D is a schematic diagram illustrating an embodiment of a user interface for a portable electronic device.
Figure 12E:
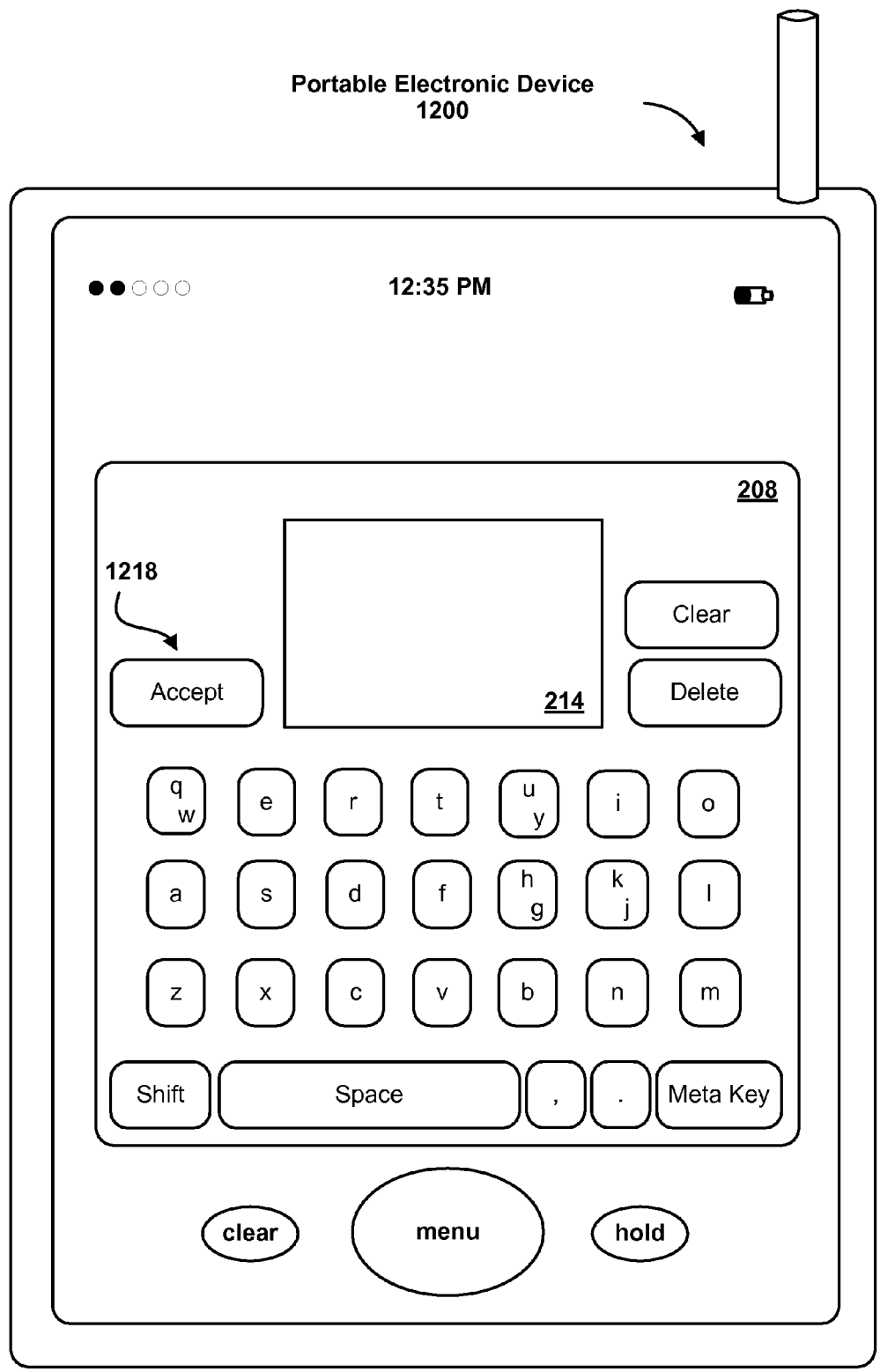
FIG. 12E is a schematic diagram illustrating an embodiment of a user interface for a portable electronic device.
Figure 12F:
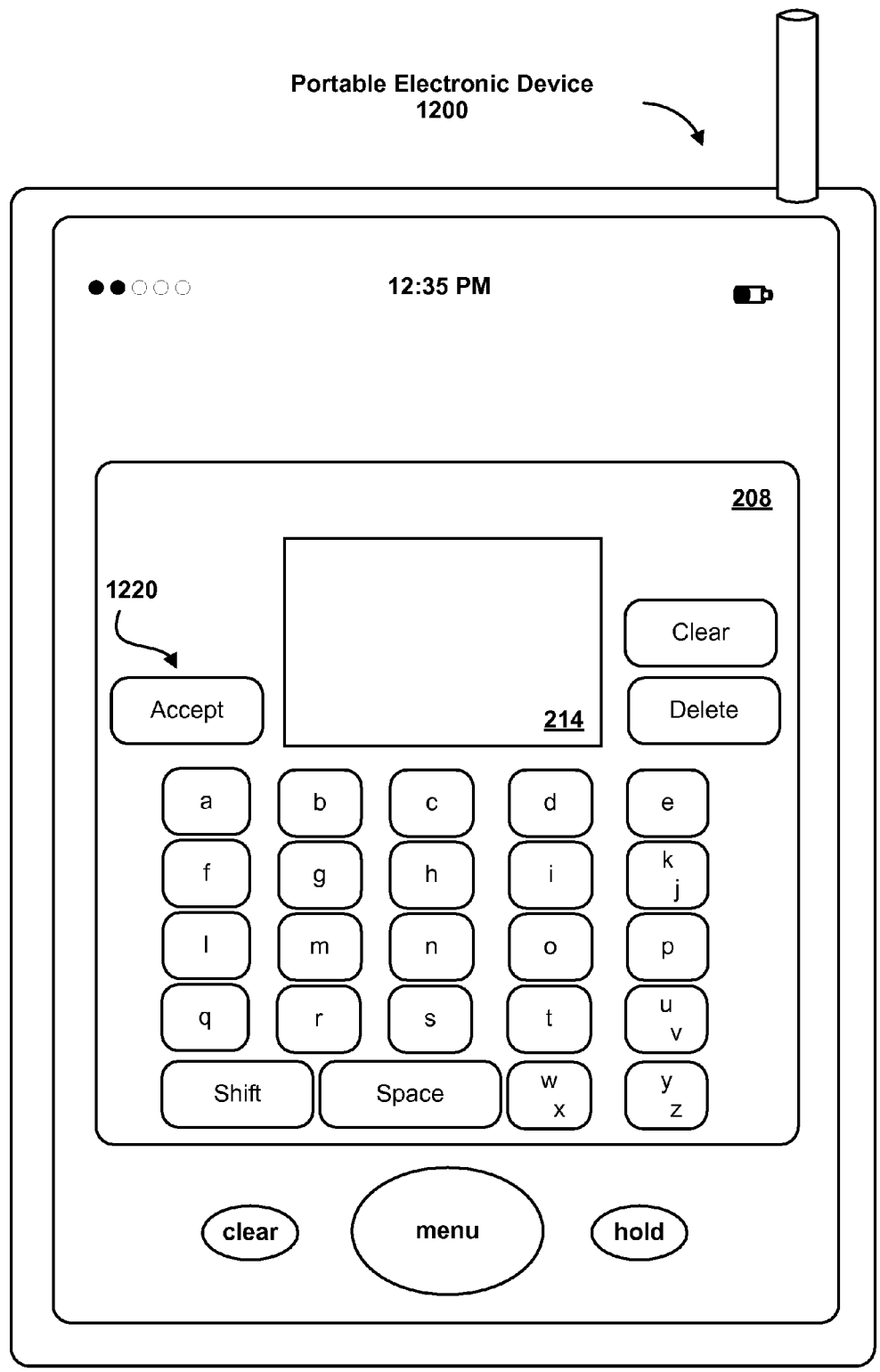
FIG. 12F is a schematic diagram illustrating an embodiment of a user interface for a portable electronic device.
Figure 12G:
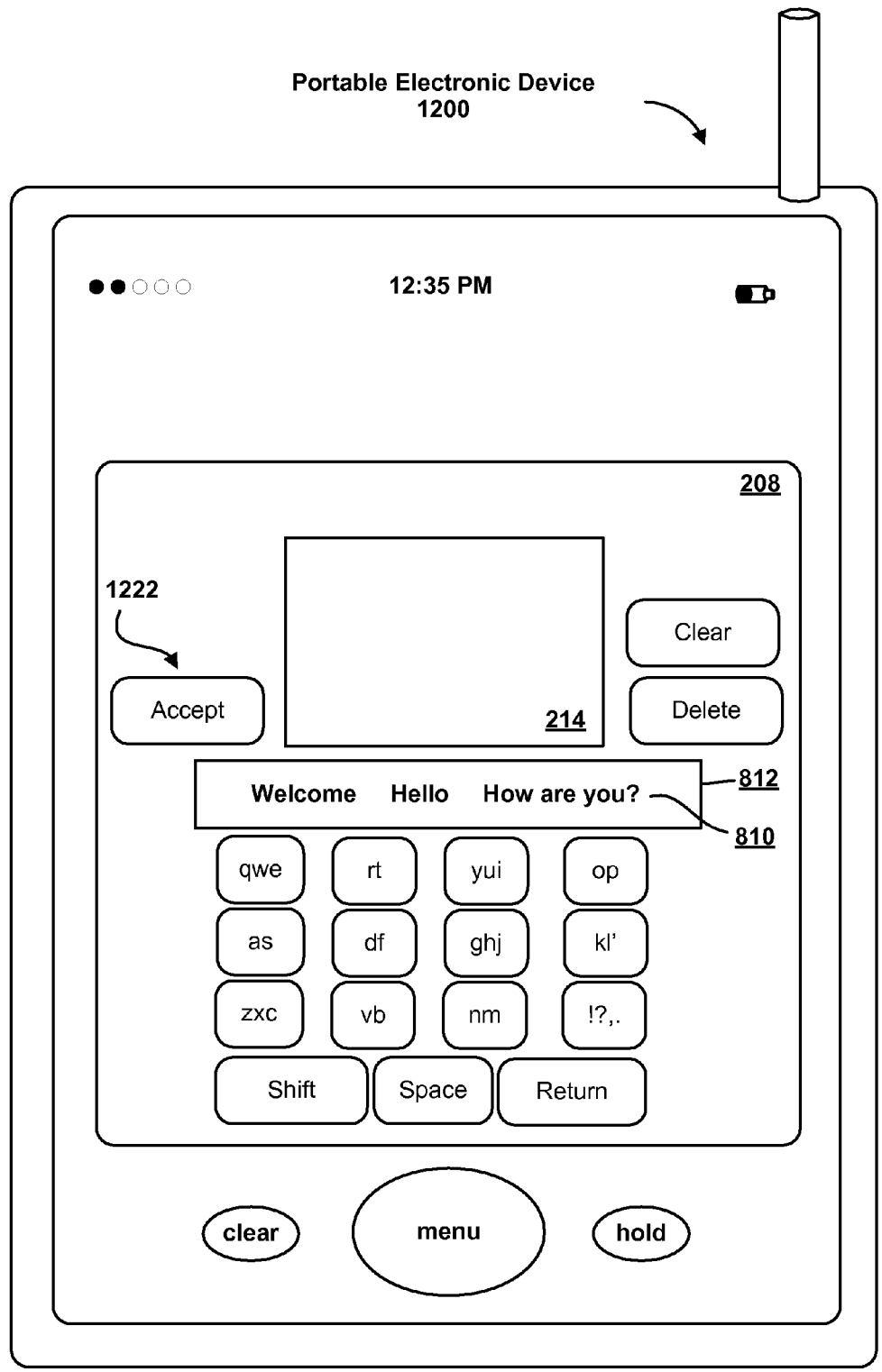
FIG. 12G is a schematic diagram illustrating an embodiment of a user interface for a portable electronic device.

FIGS. 12A-12G are schematic diagrams illustrating embodiments of a user interface for a portable electronic device 1200. These embodiments may utilize the symbol entry processes 1100 (FIG. 11A), 1130 (FIG. 11B) and/or 1150 (FIG. 11C) described previously. As shown in FIG. 12A, the device 1200 may include a keyboard 1210 with a plurality of icons. A respective icon may include two or more symbols. A first symbol for a respective icon may be selected by the user using a first gesture. A second symbol for a respective icon may be selected by the user using a second gesture. The first gesture may include a continuous contact with the display 208 and the second gesture may include a discontinuous contact with the display 208.

The continuous contact may include a swipe and/or a rolling motion of the contact. The discontinuous contact may include one or more consecutive taps. A respective tap may include contact with the display 208 for a time interval that is less than a fourth pre-determined value, such as 0.1, 0.5 or 1 s. In some embodiments, two or more consecutive taps may correspond to a second symbol if a time interval between the two or more consecutive taps is less than a fifth pre-determined value, such as 0.1, 0.5 or 1 s.

In some embodiments, the first symbol is in a first subset of the symbols in the character set displayed in the keyboard 1210 and the second symbol is in a second subset of the symbols in the character set displayed in the keyboard 1210. The first subset may have a probability of occurrence that is greater than a sixth pre-determined value and the second subset may have a probability of occurrence that is less than the sixth pre-determined value. Thus, the first subset may include symbols that are more likely to occur, for example, in a language (using a lexicography model) and/or based on a user history. The gesture used to select the first symbol may, therefore, be easier or quicker for the user to make. For example, the first gesture may be a tap gesture and the second gesture may be a swipe gesture. This is illustrated in FIG. 12A. The gestures needed to select corresponding symbols for a respective icon may be indicated on the icon. For example, a dot on the icon may correspond to a tap and a horizontal line on the icon may correspond to a dash. This 'tap-dash' embodiment is an example of a two-gesture keyboard. Additional examples are discussed below.

In some embodiments, the first symbol may have a probability of occurrence immediately after the second symbol that is less than a seventh pre-determined value. In some embodiments, the second symbol may have a probability of occurrence immediately after the first symbol that is less than a seventh pre-determined value. This arrangement or grouping of the symbols displayed on the icons may reduce errors when using the keyboard 1210 because the user will be less likely to make a first gesture for the first symbol corresponding to a respective icon and then make the second gesture for the second symbol corresponding to the respective icon (or vice versa). Gestures for different symbols on the respective icon may, therefore, be separated by a time interval that is large enough to reduce a likelihood of inadvertently selecting a respective symbol using consecutive gestures for symbols corresponding to the respective icon.

FIGS. 12B-12G illustrate additional multi-gesture keyboards. For the icons in keyboards 1212, 1214, 1216, 1218, 1220 and 1222, a first symbol for a respective icon in these keyboards may be selected with a first gesture (for example, a single tap) and a second symbol for the respective icon may be selected using a second gesture (for example, two consecutive taps). The keyboard 1222 in FIG. 12G includes some icons that correspond to more than two symbols. These symbols may be selected by making additional gestures, such as three consecutive taps. In some embodiments, a second or third symbol for the respective icon may be selected by the user by first contacting a meta key, such as a shift key, and then contacting and/or breaking contact with the respective icon.

While the device 1200 has been illustrated with certain components and a particular arrangement of these components, it should be understood that there may be fewer or more components, two or more components may be combined, and positions of one or more components may be changed. For example, the keyboards 1210, 1212, 1214, 1216, 1218, 1220 and/or 1222 may include fewer or additional icons. In some embodiments, a different character set and/or different groups of symbols may be used on the icons in the keyboard 1210, 1212, 1214, 1216, 1218, 1220 and/or 1222.

In some embodiments, the user selects symbols by breaking a contact with one or more icons on the display 208. In other embodiments, however, the user may select one or more symbols without breaking contact with the display 208. For example, the user may pause or maintain contact over the respective icon for a time interval longer than an eighth pre-determined value (such as 0.1, 0.5 or 1 s) before moving on to the next icon and corresponding symbol. In the process, the user may maintain contact with the display. In other embodiments, selection of the respective icon and corresponding symbol may occur by increasing a contact pressure with the display 208 while maintaining the contact with the display.

Figure 13:
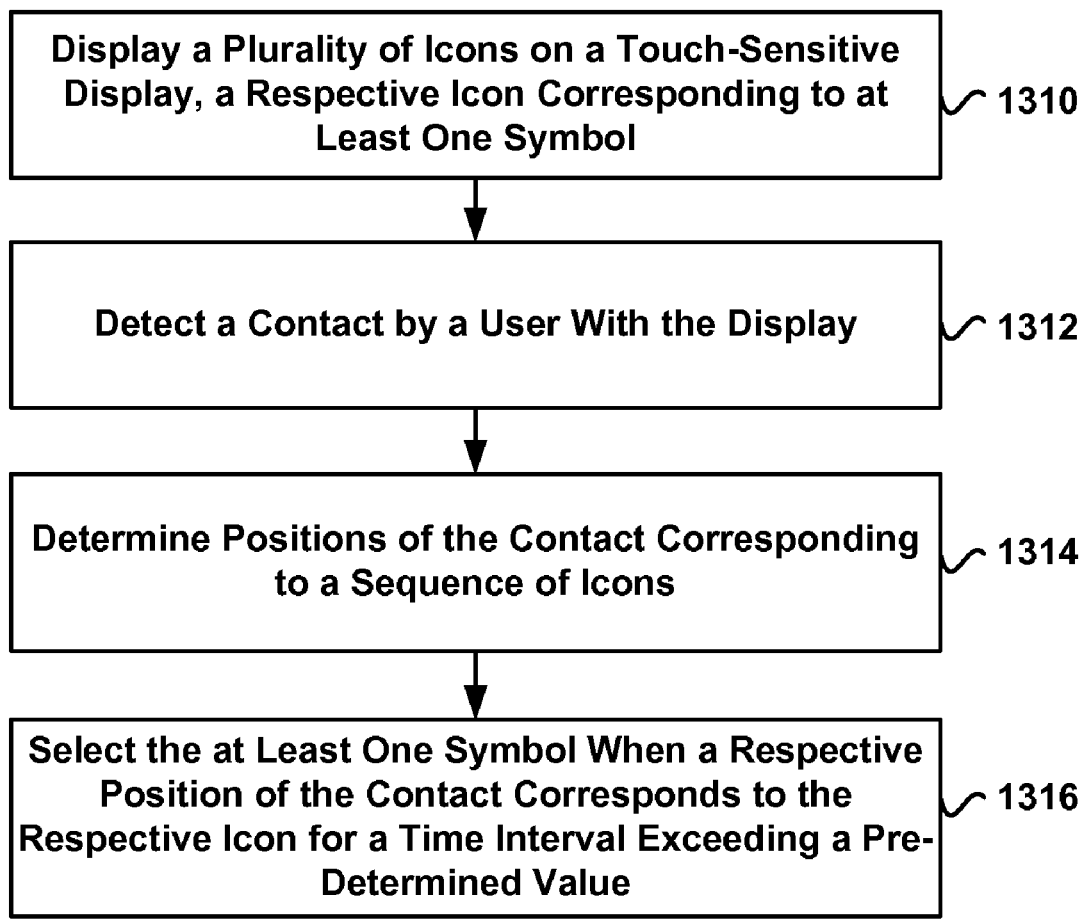
FIG. 13 is a flow diagram of an embodiment of a symbol entry process.

A flow chart for a symbol entry process 1300 corresponding to embodiments where contact is not broken is shown in FIG. 13. While the symbol entry process 1300 described below includes a number of operations that appear to occur in a specific order, it should be apparent that the process 1300 can include more or fewer operations, which can be executed serially or in parallel (e.g., using parallel processors or a multi-threading environment), an order of two or more operations may be changed and/or two or more operations may be combined into a single operation.

A plurality of icons may be displayed on a touch-sensitive display (1310). A respective icon may correspond to at least one symbol. A contact by a user with the display may be detected (1312). Positions of the contact corresponding to a sequence of icons may be determined (1314). The at least one symbol may be selected when a respective position of the contact corresponds to the respective icon for a time interval exceeding a pre-determined value (1316).

As discussed previously, the user may make errors when using a touch screen in the display system 112 (FIG. 1). The device 100 (FIG. 1) may, therefore, adapt an offset between an estimated contact and an actual contact in accordance with such errors. Feedback may be provided by the user activating an icon corresponding to a delete key. The offset may be applied to one or more icons. In some embodiments, there may be more than one offset and a respective offset may be applied to a respective subset that includes one or more icons in a plurality of the icons in a keyboard or other user interface. The adaptation may occur continuously, after a pre-determined time interval and/or if an excessive number of user errors occur (e.g., as evidenced by a frequency of use of the delete icon). The adaptation may occur during a normal mode of operation of the device 100 (FIG. 1), rather than requiring the user to implement a separate keyboard training/adaptation mode.

Figure 14:
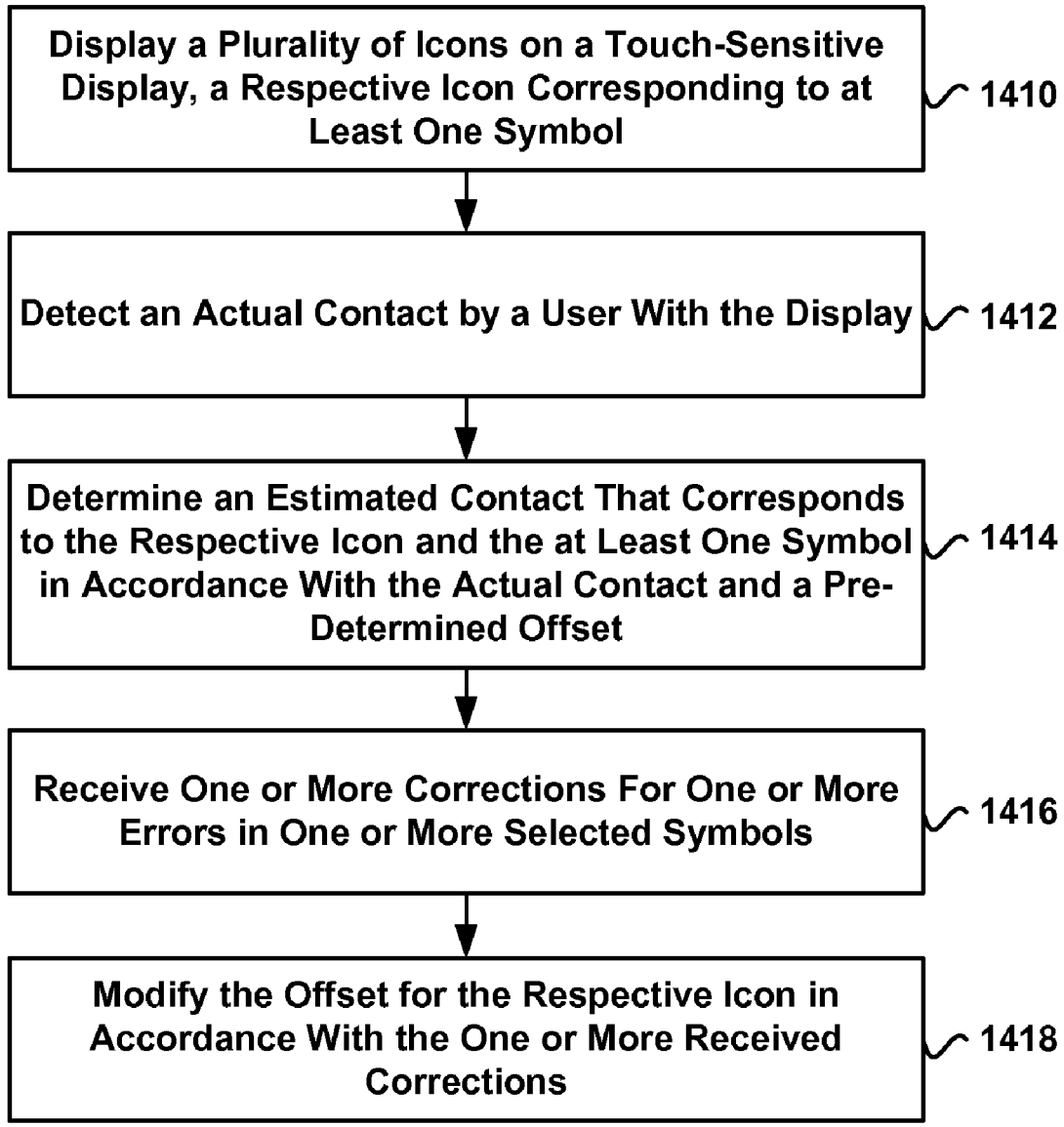
FIG. 14 is a flow diagram of an embodiment of a symbol entry process.

A flow chart for a symbol entry process 1400 corresponding to such embodiments is shown in FIG. 14. While the symbol entry process 1400 described below includes a number of operations that appear to occur in a specific order, it should be apparent that the process 1400 can include more or fewer operations, which can be executed serially or in parallel (e.g., using parallel processors or a multi-threading environment), an order of two or more operations may be changed and/or two or more operations may be combined into a single operation.

A plurality of icons may be displayed on a touch-sensitive display (1410). A respective icon may correspond to at least one symbol. A contact by a user with the display may be detected (1412). An estimated contact that corresponds to the respective icon and the at least one symbol may be determined in accordance with the actual contact and pre-determined offset (1414). One or more corrections for one or more errors in one or more selected symbols may be received (1416). The offset for at least the respective icon may be modified in accordance with the one or more received corrections (1418).

Figure 15:
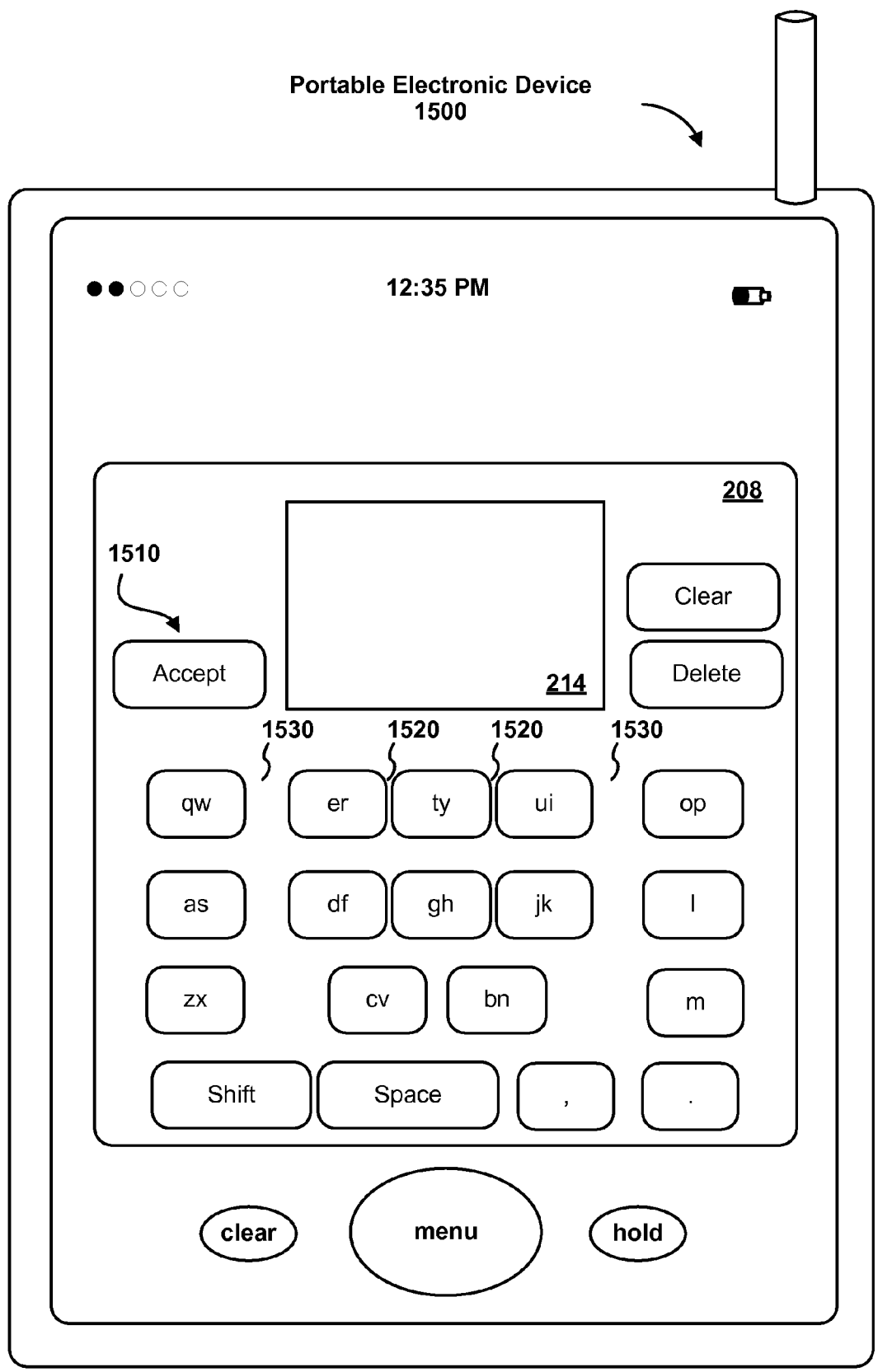
FIG. 15 is a schematic diagram illustrating an embodiment of a user interface for a portable electronic device.

FIG. 15 is a schematic diagram illustrating an embodiment of a user interface for a portable electronic device 1500. The device 1500 includes a keyboard 1510 with a plurality of icons. Different spacings ("guard bands") are used between the icons. The guard bands between icons visually encourage a user to touch the center of an adjacent icon, although user contact in the guard band region may also activate the nearest icon to the contact. In some embodiments, icons near the center of the display 208 may have a smaller guard band between adjacent icons than icons near an edge of the display. This may reduce errors when using the display 208 if it is easier for a user to select or contact a respective icon near the center of the display 208. In some embodiments, the guard band near the edge of the display 208 may be larger than that near the center of the display 208. Conversely, in some embodiments (opposite to what is shown in FIG. 15), icons near the center of the display 208 may have a larger guard band between adjacent icons than icons near an edge of the display. This may reduce errors when using the display 208 if it is easier for a user to select or contact a respective icon near the edge of the display 208. In some embodiments, the guard band near the edge of the display 208 may be smaller than that near the center of the display 208. In some embodiments, icons near the center of the display 208 may be larger than icons near the edge of the display 208. In some embodiments, icons at the edge of the display are about half the size of the other icons because it is easier to identify contacts corresponding to edge icons.

In some embodiments, either the size of the icons or the size of the guard bands between icons could incrementally vary between the edge of the display and the center of the display (e.g., from small icons at the edge to large icons in the center or from small guard bands at the edge to large guard bands in the center).

A flow chart for a symbol entry process 1600 corresponding to such embodiments is shown in FIG. 16. While the symbol entry process 1600 described below includes a number of operations that appear to occur in a specific order, it should be apparent that the process 1600 can include more or fewer operations, which can be executed serially or in parallel (e.g., using parallel processors or a multi-threading environment), an order of two or more operations may be changed and/or two or more operations may be combined into a single operation.

A plurality of icons may be displayed on a touch-sensitive display (1610). The plurality of icons may be arranged in rows in a first dimension of the display. A first guard band in the first dimension between adjacent icons in a first subset of the icons may be greater than a pre-determined value and a second guard band in the first dimension between adjacent icons in a second subset of the icons may be less than a pre-determined value. A contact by the user with the display that corresponds to selection of the respective icon may be detected (1612). A symbol corresponding to the respective icon may be displayed (1614).

Figure 17:
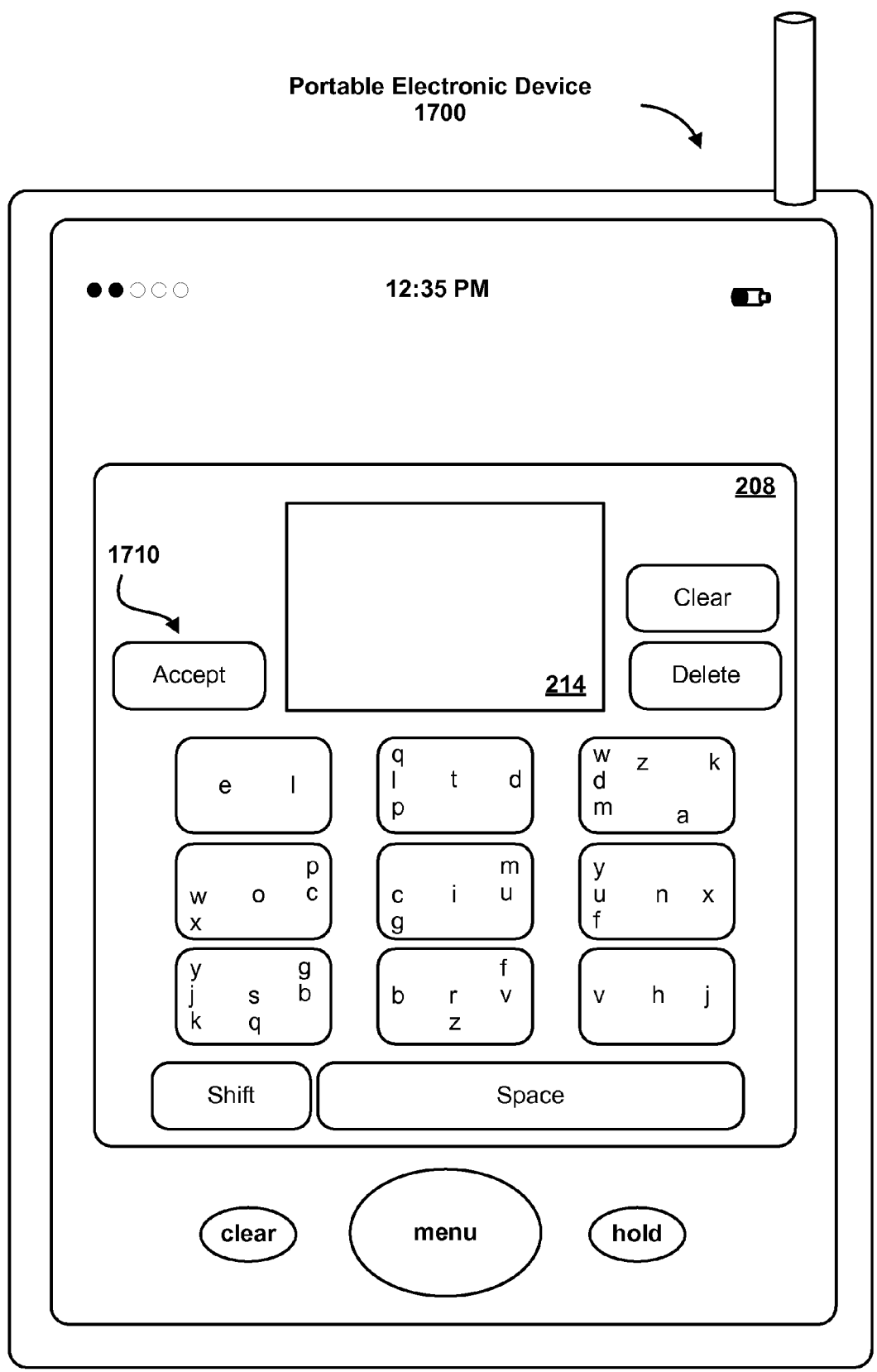
FIG. 17 is a schematic diagram illustrating an embodiment of a user interface for a portable electronic device.

FIG. 17 is a schematic diagram illustrating an embodiment of a user interface for a portable electronic device 1700. The device 1700 includes a keyboard 1710 that has a plurality of icons. A respective icon corresponds to two or more symbols. Some symbols may be selected by contacting two or more icons simultaneously. A respective symbol that is selected may be displayed in the display tray 214. For example, a letter 'e' may be selected by contacting and breaking contact with the first icon in the first row. A letter 'l' may be selected by contacting and breaking contact with the first and the second icons in the first row. The icons include visual information indicating the combinations of contacts with icons (also referred to as chords) that correspond to given symbols. Keyboard 1710 is sometimes referred to as a hop-scotch keyboard.

Figure 18:
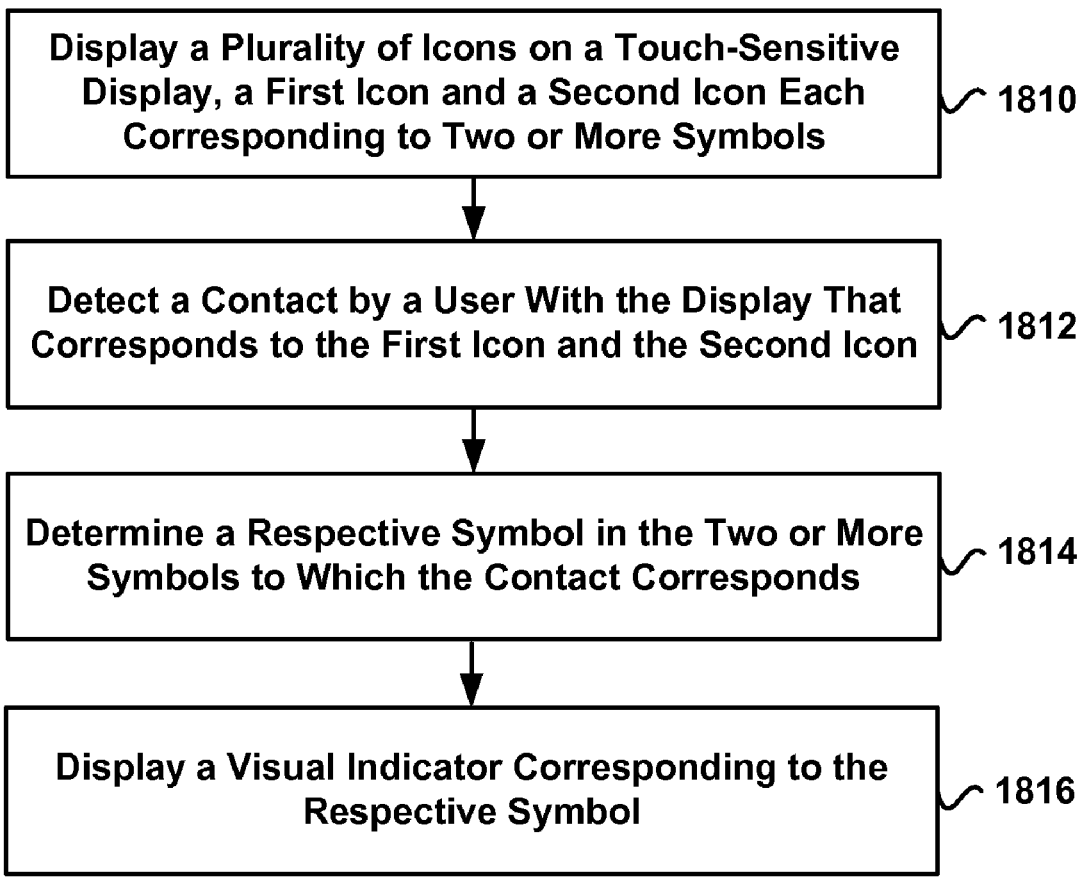
FIG. 18 is a flow diagram of an embodiment of a symbol entry process.

A flow chart for a symbol entry process 1800 corresponding to such embodiments is shown in FIG. 18. While the symbol entry process 1800 described below includes a number of operations that appear to occur in a specific order, it should be apparent that the process 1800 can include more or fewer operations, which can be executed serially or in parallel (e.g., using parallel processors or a multi-threading environment), an order of two or more operations may be changed and/or two or more operations may be combined into a single operation.

A plurality of icons may be displayed on a touch-sensitive display (1810). A first icon and a second icon each correspond to two or more symbols. A contact by a user with the display that corresponds to the first icon and the second icon is detected (1812). A respective symbol in the two or more symbols to which the contact corresponds may be determined (1814). A visual indicator corresponding to the respective symbol is displayed (1816).

Figure 19:
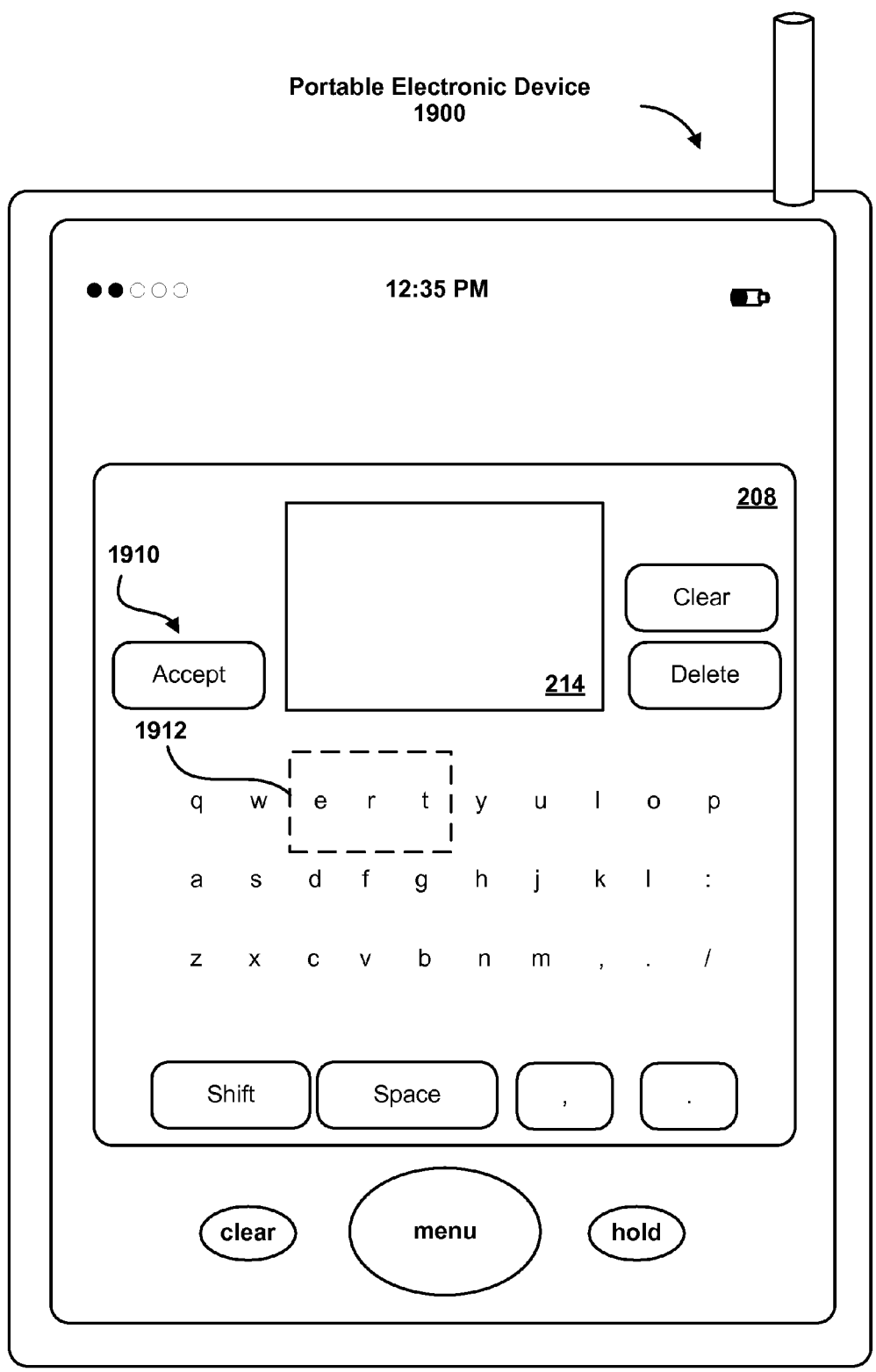
FIG. 19 is a schematic diagram illustrating an embodiment of a user interface for a portable electronic device.

FIG. 19 is a schematic diagram illustrating an embodiment of a user interface for a portable electronic device 1900. A keyboard 1910 does not include fixed icons. Instead symbols are displayed. A nearest group of symbols, such as three letters in a region 1912, are selected in accordance with a user contact with the display 208. In other embodiments, the region 1912 may include two or more symbols or characters. A correct set of symbols may be determined using a lexicography model or system, such as that shown in FIG. 10A, in accordance with a sequence of groups of symbols that correspond to a sequence of contacts by the user. As more contacts occur, a tree of possible words or sets of symbols corresponding to the groups of symbols that have been selected may be pruned until a correct or highest likelihood word or set of symbols is determined.

In other embodiments not shown, a respective user may play a game that is used to determine a smallest acceptable key size for a user interface, such as a keyboard. The smallest key size may be in accordance with a user's manual dexterity, age, health, finger size and vision. Errors made in using the icons in a keyboard during the game may help determine a minimum icon size for the respective user.

In some embodiments, icons in the embodiments of the user interfaces, such as the keyboards described above, may have an effective contact area or a strike area that is larger than the displayed icon size. In other embodiments, the effective contact area or strike area may be larger than the displayed icon size in at least one dimension of the display 208 surface.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at an electronic device with a touch-sensitive display:
   displaying a plurality of icons on the touch-sensitive display, wherein a respective icon in at least a subset of the plurality of icons corresponds to two or more symbols;
   detecting a finger contact by a user with the touch-sensitive display that corresponds to the respective icon;
   determining a respective first symbol in the two or more symbols to which the position of the finger contact further corresponds; modifying the displayed respective icon to indicate that the finger contact corresponds to the respective first symbol, wherein the modifying includes:
   asymmetrically distorting a shape of the respective icon towards the respective first symbol, and
   enlarging the respective first symbol;
   detecting a change of the finger contact to a different position within the respective icon, the different position corresponding to a second symbol of the two or more symbols of the respective icon, if the finger making the contact is being rolled by the user to the different position; and
   selecting the respective symbol corresponding to the respective current position of the finger contact.

2. The method of claim 1, further comprising selecting the respective symbol when the user breaks finger contact with the respective icon.

3. The method of claim 1, further comprising capitalizing the respective symbol when finger contact is maintained for a time interval exceeding a pre-determined value.

4. The method of claim 1, further comprising displaying the respective symbol in a region within the shape of the respective icon and outside of a region corresponding to the finger contact.

5. The method of claim 1, wherein the two or more symbols for the respective icon are determined in accordance with a lexicography model.

6. The method of claim 5, wherein the lexicography model corresponds to a user usage history, and wherein the user usage history occurs prior to the establishment of the finger contact.

7. The method of claim 5, wherein the lexicography model corresponds to a frequency of usage of symbols in a language.

8. The method of claim 1, wherein an initial shape of the respective icon includes an arc.

9. The method of claim 1, further comprising providing a visual indicator corresponding to the respective symbol.

10. The method of claim 9, wherein the visual indicator includes visual illumination proximate to the respective icon.

11. The method of claim 10, wherein the visual illumination includes a band around at least a portion of the respective icon.

12. The method of claim 9, wherein the visual indicator is in accordance with a user usage history that occurs prior to the detecting of the finger contact.

13. The method of claim 1, wherein the finger contact includes a gesture that is selected from the group consisting of one or more taps, a swipe and a rolling of a finger.

14. A computer program product for use in conjunction with an electronic device with a touch-sensitive display, the computer program product comprising a computer readable storage medium and a computer program mechanism embedded therein, the computer program mechanism comprising instructions for:
displaying a plurality of icons on the touch-sensitive display, wherein a respective icon in at least a subset of the plurality of icons corresponds to two or more symbols;
detecting a finger contact by a user with the touch-sensitive display that corresponds to the respective icon;
determining a respective first symbol in the two or more symbols to which the position of the finger contact further corresponds;
modifying the displayed respective icon to indicate that the finger contact corresponds to the respective first symbol, wherein the modifying includes:
asymmetrically distorting a shape of the respective icon towards the respective first symbol, and
enlarging the respective first symbol;
detecting a change of the finger contact to a different position within the respective icon, the different position corresponding to a second symbol of the two or more symbols of the respective icon, if the finger making the contact is being rolled by the user to the different position; and
selecting the respective symbol corresponding to the respective current position of the finger contact.

15. A graphical user interface on an electronic device with a touch-sensitive display, a memory, and one or more processors to execute one or more programs stored in the memory, the graphical user interface comprising:
a plurality of icons displayed on the touch-sensitive display, wherein a respective icon in at least a subset of the plurality of icons includes two or more symbols;
wherein:
a finger contact by a user with the touch-sensitive display is detected that corresponds to the respective icon;
a respective first symbol in the two or more symbols is determined to which the position of the finger contact further corresponds;
the displayed respective icon is modified to indicate that the finger contact corresponds to the respective first symbol by asymmetrically distorting a shape of the respective icon towards the respective first symbol and enlarging the respective first symbol;
a change of the finger contact to a different position within the respective icon is detected, the different position corresponding to a second symbol of the two or more symbols of the respective icon, if the finger making the contact is being rolled by the user to the different position; and
the respective symbol corresponding to the respective current position of the finger contact is selected.

16. A portable electronic device, comprising:
a touch-sensitive display;
one or more processors;
memory; and
a program, wherein the program is stored in the memory and configured to be executed by the one or more processors, the program including:
instructions for displaying a plurality of icons on the touch-sensitive display, wherein a respective icon in at least a subset of the plurality of icons corresponds to two or more symbols;
instructions for detecting a finger contact by a user with the touch-sensitive display that corresponds to the respective icon;
instructions for determining a respective first symbol in the two or more symbols to which the position of the finger contact further corresponds;
instructions for modifying the displayed respective icon to indicate that the finger contact corresponds to the respective first symbol, wherein the modifying includes:
asymmetrically distorting a shape of the respective icon towards the respective first symbol, and
enlarging the respective first symbol;
instructions for detecting a change of the finger contact to a different position within the respective icon, the different position corresponding to a second symbol of the two or more symbols of the respective icon, if the finger making the contact is being rolled by the user to the different position; and
instructions for selecting the respective symbol corresponding to the respective current position of the finger contact.

17. A portable electronic device, comprising:
touch-sensitive display means;
one or more processor means;
memory means; and
program mechanism, wherein the program mechanism is stored in the memory means and configured to be executed by the one or more processors means, the program mechanism including:
instructions for displaying a plurality of icons on the touch-sensitive display, wherein a respective icon in at least a subset of the plurality of icons corresponds to two or more symbols;
instructions for detecting a finger contact by a user with the touch-sensitive display that corresponds to the respective icon;
instructions for determining a respective first symbol in the two or more symbols to which the position of the finger contact further corresponds;
instructions for modifying the displayed respective icon to indicate that the finger contact corresponds to the respective first symbol, wherein the modifying includes:
asymmetrically distorting a shape of the respective icon towards the respective first symbol, and
enlarging the respective first symbol;
instructions for detecting a change of the finger contact to a different position within the respective icon, the different position corresponding to a second symbol of the two or more symbols of the respective icon, if the finger making the contact is being rolled by the user to the different position; and
instructions for selecting the respective symbol corresponding to the respective current position of the finger contact.

* * * * *

UNITED STATES PATENT AND TRADEMARK OFFICE
CERTIFICATE OF CORRECTION

| | | |
|---|---|---|
| PATENT NO. | : 7,694,231 B2 | Page 1 of 1 |
| APPLICATION NO. | : 11/459606 | |
| DATED | : April 6, 2010 | |
| INVENTOR(S) | : Kenneth Kocienda et al. | |

It is certified that error appears in the above-identified patent and that said Letters Patent is hereby corrected as shown below:

On page 2, in column 2, under "Other Publications", line 39, delete "http://www.chidagologic.com," and insert -- http://www.chicagologic.com, --, therefor.

On page 2, in column 2, under "Other Publications", line 42, delete "WikiPodLinus," and insert -- WikiPodLinux, --, therefor.

In column 4, line 51, delete "y," and insert -- y --, therefor.

Signed and Sealed this
Fifteenth Day of November, 2011

David J. Kappos
*Director of the United States Patent and Trademark Office*